(12) United States Patent
Easwaran et al.

(10) Patent No.: US 9,612,868 B2
(45) Date of Patent: Apr. 4, 2017

(54) SYSTEMS AND METHODS GENERATING INTER-GROUP AND INTRA-GROUP EXECUTION SCHEDULES FOR INSTRUCTION ENTITY ALLOCATION AND SCHEDULING ON MULTI-PROCESSORS

(71) Applicant: Honeywell International Inc., Morristown, NJ (US)

(72) Inventors: Arvind Easwaran, Minneapolis, MN (US); Srivatsan Varadarajan, St. Louis Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 439 days.

(21) Appl. No.: 13/665,294

(22) Filed: Oct. 31, 2012

(65) Prior Publication Data
US 2014/0122848 A1 May 1, 2014

(51) Int. Cl.
*G06F 9/46* (2006.01)
*G06F 9/455* (2006.01)
*G06F 9/48* (2006.01)

(52) U.S. Cl.
CPC .......... *G06F 9/4881* (2013.01); *G06F 9/4887* (2013.01); *G06F 2209/483* (2013.01)

(58) Field of Classification Search
None
See application file for complete search history.

(56) References Cited

U.S. PATENT DOCUMENTS

| 5,745,778 A | 4/1998 | Alfieri |
| 6,438,553 B1 | 8/2002 | Yamada |
| 6,560,628 B1 | 5/2003 | Murata |

(Continued)

FOREIGN PATENT DOCUMENTS

| WO | 02054238 | 7/2002 |
| WO | 2006004826 | 1/2006 |

(Continued)

OTHER PUBLICATIONS

European Patent Office, "Office Action", "from Foreign Counterpart of U.S. Appl. No. 13/195,503", Feb. 5, 2013, pp. 1-6, Published in: EP.

(Continued)

*Primary Examiner* — Meng An
*Assistant Examiner* — Bradley Teets
(74) *Attorney, Agent, or Firm* — Fogg & Powers LLC

(57) ABSTRACT

Systems and methods for instruction entity allocation and scheduling on multi-processors is provided. In at least one embodiment, a method for generating an execution schedule for a plurality of instruction entities for execution on a plurality of processing units comprises arranging the plurality of instruction entities into a sorted order and allocating instruction entities in the plurality of instruction entities to individual processing units in the plurality of processing units. The method further comprises scheduling instances of the instruction entities in scheduled time windows in the execution schedule, wherein the instances of the instruction entities are scheduled in scheduled time windows according to the sorted order of the plurality of instruction entities and organizing the execution schedule into execution groups.

18 Claims, 15 Drawing Sheets

(56) References Cited

U.S. PATENT DOCUMENTS

| | | | |
|---|---|---|---|
| 6,622,302 B1* | 9/2003 | Delaney et al. | 717/170 |
| 6,678,712 B1 | 1/2004 | McLaren et al. | |
| 6,754,690 B2 | 6/2004 | Larson | |
| 6,964,048 B1 | 11/2005 | Isham | |
| 6,993,753 B2* | 1/2006 | Yamanaka et al. | 717/140 |
| 7,107,590 B2 | 9/2006 | Bril et al. | |
| 7,140,022 B2 | 11/2006 | Binns | |
| 7,165,252 B1 | 1/2007 | Xu | |
| 7,222,218 B2 | 5/2007 | Dutt et al. | |
| 7,302,685 B2 | 11/2007 | Binns | |
| 7,444,638 B1 | 10/2008 | Xu | |
| 7,472,389 B2 | 12/2008 | Smith | |
| 7,681,014 B2 | 3/2010 | Jensen et al. | |
| 7,788,673 B2 | 8/2010 | Bibby | |
| 7,827,551 B2 | 11/2010 | Kulbak | |
| 7,840,966 B2 | 11/2010 | Dodge | |
| 7,844,952 B2 | 11/2010 | Barsness et al. | |
| 7,873,507 B2 | 1/2011 | Tatsuoka et al. | |
| 7,908,604 B2 | 3/2011 | Takayama | |
| 7,913,256 B2 | 3/2011 | Torii et al. | |
| 8,036,688 B2 | 10/2011 | Oh | |
| 8,074,222 B2 | 12/2011 | Hirai | |
| 8,209,701 B1 | 6/2012 | Roytman et al. | |
| 8,527,971 B2 | 9/2013 | Helovuo | |
| 8,607,236 B2 | 12/2013 | Kawano et al. | |
| 8,893,144 B2* | 11/2014 | Haham et al. | 718/104 |
| 2001/0023434 A1 | 9/2001 | Viollet et al. | |
| 2001/0054055 A1 | 12/2001 | Bollella | |
| 2002/0120661 A1 | 8/2002 | Binns | |
| 2002/0124043 A1 | 9/2002 | Otero Perez et al. | |
| 2002/0198925 A1 | 12/2002 | Smith et al. | |
| 2003/0069917 A1 | 4/2003 | Miller | |
| 2003/0088606 A1 | 5/2003 | Miller | |
| 2003/0101084 A1 | 5/2003 | Otero Perez | |
| 2003/0154234 A1 | 8/2003 | Larson | |
| 2005/0028160 A1 | 2/2005 | Cofer et al. | |
| 2005/0066330 A1 | 3/2005 | Kanai et al. | |
| 2006/0085582 A1 | 4/2006 | Shikano et al. | |
| 2006/0107264 A1 | 5/2006 | Schmidt et al. | |
| 2006/0136915 A1 | 6/2006 | Aingaran | |
| 2006/0206887 A1 | 9/2006 | Dodge et al. | |
| 2006/0218558 A1* | 9/2006 | Torii et al. | 718/107 |
| 2007/0204268 A1 | 8/2007 | Drepper | |
| 2007/0294384 A1 | 12/2007 | Nakajima et al. | |
| 2008/0028415 A1 | 1/2008 | Binns et al. | |
| 2008/0317026 A1 | 12/2008 | Vogl et al. | |
| 2009/0031317 A1 | 1/2009 | Gopalan et al. | |
| 2009/0113426 A1 | 4/2009 | Mizuno | |
| 2009/0158297 A1 | 6/2009 | Lee | |
| 2009/0217280 A1 | 8/2009 | Miller | |
| 2009/0307700 A1 | 12/2009 | Cazorla Almeida | |
| 2010/0088706 A1* | 4/2010 | Dong et al. | 718/103 |
| 2010/0131955 A1 | 5/2010 | Brent et al. | |
| 2010/0199280 A1 | 8/2010 | Vestal et al. | |
| 2010/0268912 A1 | 10/2010 | Conte et al. | |
| 2010/0306750 A1* | 12/2010 | Helovuo | 717/143 |
| 2010/0333098 A1 | 12/2010 | Jordan et al. | |
| 2011/0067029 A1 | 3/2011 | Wolfe et al. | |
| 2011/0252426 A1* | 10/2011 | Antani et al. | 718/101 |
| 2011/0314476 A1 | 12/2011 | Choi | |
| 2012/0284732 A1* | 11/2012 | Griglock et al. | 718/104 |
| 2013/0036421 A1 | 2/2013 | Miller et al. | |
| 2013/0036423 A1 | 2/2013 | McCready et al. | |
| 2013/0205301 A1 | 8/2013 | Easwaran et al. | |

FOREIGN PATENT DOCUMENTS

| | | |
|---|---|---|
| WO | 2009007169 | 1/2009 |
| WO | 2010001353 | 1/2010 |
| WO | 2012005637 | 1/2012 |

OTHER PUBLICATIONS

European Patent Office, "European Search Report", "from Foreign Counterpart of U.S. Appl. No. 13/195,503", Jan. 24, 2013, pp. 1-4, Published in: EP.

European Patent Office, "Office Action", "from Foreign Counterpart of U.S. Appl. No. 13/195,529", Feb. 13, 2013, pp. 1-7, Published in: EP.

European Patent Office, "European Search Report", "from Foreign Counterpart of U.S. Appl. No. 13/195,529", Feb. 1, 2013, pp. 1-3, Published in: EP.

Cronk, "Improve CPU Utilization with DEOS Slack RTOS Scheduling", Sep. 28, 2009, pp. 1-6.

Feitelson et al., "Distributed Hierarchical Control for Parallel Processing", May 1990, pp. 65-78.

MacAriu, "A Model Checking Approach for Multi-core Time Partitions Design", "2010 10th IEEE International Conference on Computer and Information Technology", Jun. 2010, pp. 1910-1917.

Vanderleest, "ARINC 653 Hypervisor", "Digital Avionics Systems Conference 2010", Oct. 2010, pp. 1-20.

European Patent Office, "European Search Report from EP Application No. 13187196.4 mailed Jun. 13, 2014", "from Foreign Counterpart of U.S. Appl. No. 13/665,294", Jun. 13, 2014, pp. 1-4, Published in: EP.

Kopetz, "Real-Time Systems: Design Principles for Distributed Embedded Applications Second Edition", 2011, p. 1-387, Publisher: Springer Science + Business Media, LLC.

Nemati et al., "Multiprocessor Synchronization and Hierarchical Scheduling", "International Conference on Parallel Processing Workshops", Sep. 22, 2009, pp. 58-64, Published in: SE.

Sprunt et al., "Aperiodic Task Scheduling for Hard-Real-Time Systems", "The Journal of Real-Time Systems", Jun. 1989, pp. 27-60.

Thomadakis, "Efficient Scheduling of Firm Aperiodic Tasks in Fixed-Priority, Hard Real-Time Systems", Mar. 2, 2011, pp. 1-28.

U.S. Patent and Trademark Office, "Notice of Allowance", "U.S. Appl. No. 13/195,529", Jun. 26, 2013, pp. 1-26.

U.S. Patent and Trademark Office, "Notice of Allowance and Fee(s) Due", "U.S. Appl. No. 13/195,503", Aug. 18, 2014, pp. 1-12, Published in: US.

U.S. Patent and Trademark Office, "Advisory Action", "from U.S. Appl. No. 13/195,503", Mar. 27, 2014, pp. 1-3, Published in: US.

U.S. Patent and Trademark Office, "Advisory Action ", "from U.S. Appl. No. 13/367,042", Apr. 10, 2014, pp. 1-3, Published in: US.

U.S. Patent and Trademark Office, "Office Action", "U.S. Appl. No. 13/195,529", Apr. 24, 2013, pp. 1-29.

U.S. Patent and Trademark Office, "Notice of Allowance ", "from U.S. Appl. No. 13/195,503", May 9, 2014, pp. 1-12, Published in: US.

European Patent Office, "European Search Report from EP Application No. 13152396.1 mailed Apr. 25, 2014", "from Foriegn Counterpart of U.S. Appl. No. 13/367,042", filed Apr. 25, 2014, pp. 1-3, Published in: EP.

U.S. Patent and Trademark Office, "Office Action", "U.S. Appl. No. 13/195,503", Jun. 7, 2013, pp. 1-30.

European Patent Office, "Office Action from EP Application No. 13152396.1 mailed May 20, 2014", "from Foreign Counterpart of U.S. Appl. No. 13/367,042", filed May 20, 2014, pp. 1-8, Published in: EP.

U.S. Patent and Trademark Office, "Office Action", "from U.S. Appl. No. 13/367,042", Jun. 20, 2014, p. 1-19, Published in: US.

European Patent Office, "European Office Action From EP Application No. 12177868.2", "from European Counterpart of U.S. Appl. No. 13/195,503", filed Jul. 21, 2014, pp. 1-5.

European Patent Office, "European Office Action From EP Application No. 12177911.0", "from Euorpean Counterpart of U.S. Appl. No. 13/195,529", filed Jul. 21, 2014, pp. 1-5.

European Patent Office, "Office Action from EP Application No. 13187196.4 mailed Jul. 3, 2014", "from Foreign Counterpart of U.S. Appl. No. 13/665,294", filed Jul. 3, 2014, pp. 1-14, Published in: EP.

(56) References Cited

OTHER PUBLICATIONS

U.S. Patent and Trademark Office, "Office Action", "from U.S. Appl. No. 13/367,042", Aug. 16, 2013, pp. 1-42, Published in: US.
U.S. Patent and Trademark Office, "Final Office Action", "from U.S. Appl. No. 13/195,503", Jan. 7, 2014, pp. 1-22, Published in: US.
U.S. Patent and Trademark Office, "Final Office Action", "from U.S. Appl. No. 13/367,042", Dec. 20, 2013, pp. 1-50, Published in: US.
U.S. Patent and Trademark Office, "Final Office Action", "U.S. Appl. No. 13/367,042", Nov. 7, 2014, pp. 1-35.
Bini, "A Hyperbolic Bound for the Rate Monotonic Algorithm", "Proceedings of the 13th Euromicro Conference on Real-Time Systems", Jun. 2001, pp. 1-14, Published in: Delft, The Netherlands.
Bini, "Schedulability Analysis of Periodic Fixed Priority Systems", "IEEE Transactions on Computers ", Nov. 2004, pp. 1-12, vol. 53, No. 11.
Binns, "A Robust High-Performance Time Partitioning Algorithm: The Digital Engine Operating System (DEOS) Approach", Oct. 18, 2001, pp. 1-12, Publisher: IEEE.
Kato, "A Fixed-Priority Scheduling Algorithm for Multiprocessor Real-Time Systems", "Parallel and Distributed Computing", Jan. 2010, pp. 143-158.
Lehoczky, "The Rate Monotonic Scheduling Algorithm: Exact Characterization and Average Case Behavior", Dec. 7, 1989, pp. 166-171, Publisher: IEEE.
Liu, "Scheduling Algorithms for Multiprogramming in a Hard-Real-Time Environment", "Journal of the Association for Computing Machinery", Jan. 1973, pp. 46-61, vol. 20, No. 1, Published in: US.
"Why multi core processors?", "accessed Feb. 6, 2012", Jun. 13, 2010, pp. 1-3, Publisher:superuser.com/questions/152011/why-multi-core-processors.
Paolieri, "Hardware Support for WCET Analysis of Hard Real-Time Multicore Systems", "ISCA '09", Jun. 20-Jun. 24, 2009, pp. 1-12, Publisher: ACM.
Ramya, "Window Constrained Scheduling of Processes in Real Time CPU Using Multi Objective Genetic Algorithm", "International Journal of Computer Applications (0975-8887)", Feb. 2010, pp. 86-90, vol. 1, No. 21.
Srinivasan, "The Case for Fair Multiprocessor Scheduling", Nov. 2002, pp. 1-18, Publisher: Department of Computer Science University of North Carolina.
McCready et al., "Systems and Methods for Bounding Processing Times on Multiple Processing Units", "U.S. Appl. No. 13/195,503, filed Aug. 1, 2011,", pp. 1-23.
Miller et al., "Constrained Rate Monotonic Analysis and Scheduling", "U.S. Appl. No. 13/195,529, filed Aug. 1, 2011,", pp. 1-56.
Yamada, "Proposal and Evaluation of APIS for Utilizing Inter-Core Time Aggregation Scheduler", "Presented at the 15th Workshop on Job Scheduling Strategies for Parallel Processing huji.ac.il/~feit/parsched/jssp10/p11-yamada.pdf)", Apr. 23, 2010, pp. 1-18.
Yamada, "Proposal and Evaluation of APIS for Utilizing Inter-Core Time Aggregation Scheduler", Oct. 9, 2010, pp. 191-207, vol. 6253, Publisher: Springer-Verlag Berlin Heidelberg.
Yan, "WCET Analysis for Multi-Core Processors with Shared L2 Instruction Caches", "IEEE Real-Time and Embedded Technology and Applications Symposium", Apr. 22, 2008, pp. 80-89, Publisher: IEEE.
Easwaran et al., "Systems and Methods for Task Grouping on Multi-Processors", "U.S. Appl. No. 13/367,042", filed Feb. 6, 2012, pp. 1-38.
U.S. Patent and Trademark Office, "Advisory Action", "U.S. Appl. No. 13/367,042", Feb. 12, 2015, p. 1-3.
U.S. Patent and Trademark Office, "Office Action", "From U.S. Appl. No. 13/367,042", Mar. 25, 2015, p. 1-21, Published in: US.
European Patent Office, "Communication pursuant to Article 94(3) from European Patent Application No. 12177911.0", "from Foreign Counterpart to U.S. Pat. No. 8,621,473", Apr. 14, 2015, pp. 1-5, Published in: EP.
Sibsankar et al., "Real-Time and Embedded Operating Systems", "subsection title 'Rate Monotonic Scheduling Algorithm'", Nov. 25, 2009, Page(s) section 15.6.1, Publisher: Pearson India.
U.S. Patent and Trademark Office, "Notice of Allowance", "U.S. Appl. No. 13/367,042", Sep. 10, 2015, pp. 1-13.
European Patent Office, "European Office Action for Application Serial No. 12177868.2", "from Foreign Counterpart to U.S. Pat. No. 8,875,146", May 11, 2015, pp. 1-5, Published in: EP.
European Patent Office, "Office Action from EP Application No. 13187196.4 mailed Jul. 14, 2015", "from Foreign Counterpart of U.S. Appl. No. 13/665,294", filed Jul. 14, 2015, pp. 1-17, Published in: EP.
European Patent Office, "Communication pursuant to Article 94(3) EPC from European application No. 12177868.2", "from foreign counterpart of U.S. Appl. No. 13/195,503", filed Feb. 17, 2016, pp. 1-5, Published in: EP.
European Patent Office, "Communication pursuant to Article 94(3) EPC from European application No. 12177911.0", "from foreign counterpart of U.S. Appl. No. 13/195,529", filed Feb. 24, 2016, pp. 1-4, Published in: EP.
European Patent Office, "Office Action from EP Application No. 13187196.4 mailed Feb. 12, 2016", "from Foreign Counterpart of U.S. Appl. No. 13/665,294", filed Feb. 12, 2016, pp. 1-8, Published in: EP.
European Patent Office, "Communication pursuant to Article 94(3) EPC from EP Application No. 12177868.2 mailed Sep. 12, 2016", "from Foreign Counterpart U.S. Appl. No. 13/195,503", filed Sep. 12, 2016, pp. 1-5, Published in: EP.

* cited by examiner

| Instruction Entities | Period | WCET | B | NP | P |
|---|---|---|---|---|---|
| $\tau_1$ | 25 | 8 | $\tau_2$ | | |
| $\tau_2$ | 25 | 5 | | $\tau_3$ | |
| $\tau_3$ | 50 | 16 | | $\tau_2$ | $\tau_4$ |
| $\tau_4$ | 50 | 8 | | | $\tau_3, \tau_5$ |
| $\tau_5$ | 50 | 5 | | | $\tau_4$ |
| $\tau_6$ | 50 | 13 | | $\tau_7$ | $\tau_8$ |
| $\tau_7$ | 25 | 12 | | $\tau_6$ | |
| $\tau_8$ | 50 | 9 | | | $\tau_6$ |

FIG. 2

SYSTEMS AND METHODS GENERATING INTER-GROUP AND INTRA-GROUP EXECUTION SCHEDULES FOR INSTRUCTION ENTITY ALLOCATION AND SCHEDULING ON MULTI-PROCESSORS

CROSS REFERENCE TO RELATED APPLICATIONS

This application is related to co-pending U.S. patent application Ser. No. 13/195,503 entitled "SYSTEMS AND METHODS FOR BOUNDING PROCESSING TIMES ON MULTIPLE PROCESSING UNITS" filed on Aug. 1, 2011, which is hereby incorporated herein in its entirety by reference.

This application is related to co-pending U.S. patent application Ser. No. 13/195,529 entitled "CONSTRAINED RATE MONOTONIC ANALYSIS AND SCHEDULING" filed on Aug. 1, 2011, which is hereby incorporated herein in its entirety by reference.

This application is related to co-pending U.S. patent application Ser. No. 13/367,042 entitled "SYSTEMS AND METHODS FOR THREAD GROUPING ON MULTI-PROCESSORS" filed on Feb. 6, 2012, which is hereby incorporated herein in its entirety by reference.

BACKGROUND

Multiple processing units are able to process different computational instruction entities (such as threads, tasks, processes, applications, etc.) simultaneously. As such, multiple processing units can execute more instructions in a given period of time as compared to a single processing unit. During the execution of instructions, the multiple processing units share resources such as on-chip communication buses, memory controllers, caches, I/O devices, and the like. At times, instruction entities executing on different processing units interfere with one another due to these shared resources even when the different instruction entities are completely independent from one another. In certain applications, a worst case or longest execution time for the executing instruction entities must be known for the different instruction entities that execute on each processor. However, it is difficult to determine the worst case execution time due to cross-processing unit interference between executing instruction entities due to shared resources. The challenge of determining the worst case execution time due to resource conflicts inhibits certain systems from taking advantage of the full performance benefits presented by multi-processing unit processors, and also prevents them from being used in certain safety-critical environments such as those requiring a high degree of execution predictability.

Further, in certain systems, executing instruction entities are subject to certain scheduling requirements. These scheduling requirements include rules that must be satisfied for the proper execution of the multiple instruction entities. In certain systems, these scheduling requirements include constraints that require instruction entities to execute in parallel, not in parallel, or in a particular order.

SUMMARY

Systems and methods for instruction entity allocation and scheduling on multi-processors is provided. In at least one embodiment, a method for generating an execution schedule for a plurality of instruction entities for execution on a plurality of processing units comprises arranging the plurality of instruction entities into a sorted order and allocating instruction entities in the plurality of instruction entities to individual processing units in the plurality of processing units. The method further comprises scheduling instances of the instruction entities in scheduled time windows in the execution schedule, wherein the instances of the instruction entities are scheduled in scheduled time windows according to the sorted order of the plurality of instruction entities and organizing the execution schedule into execution groups.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 is a table illustrating execution constraints and requirements for multiple instruction entities in one embodiment described in the present disclosure;

Figure 1:
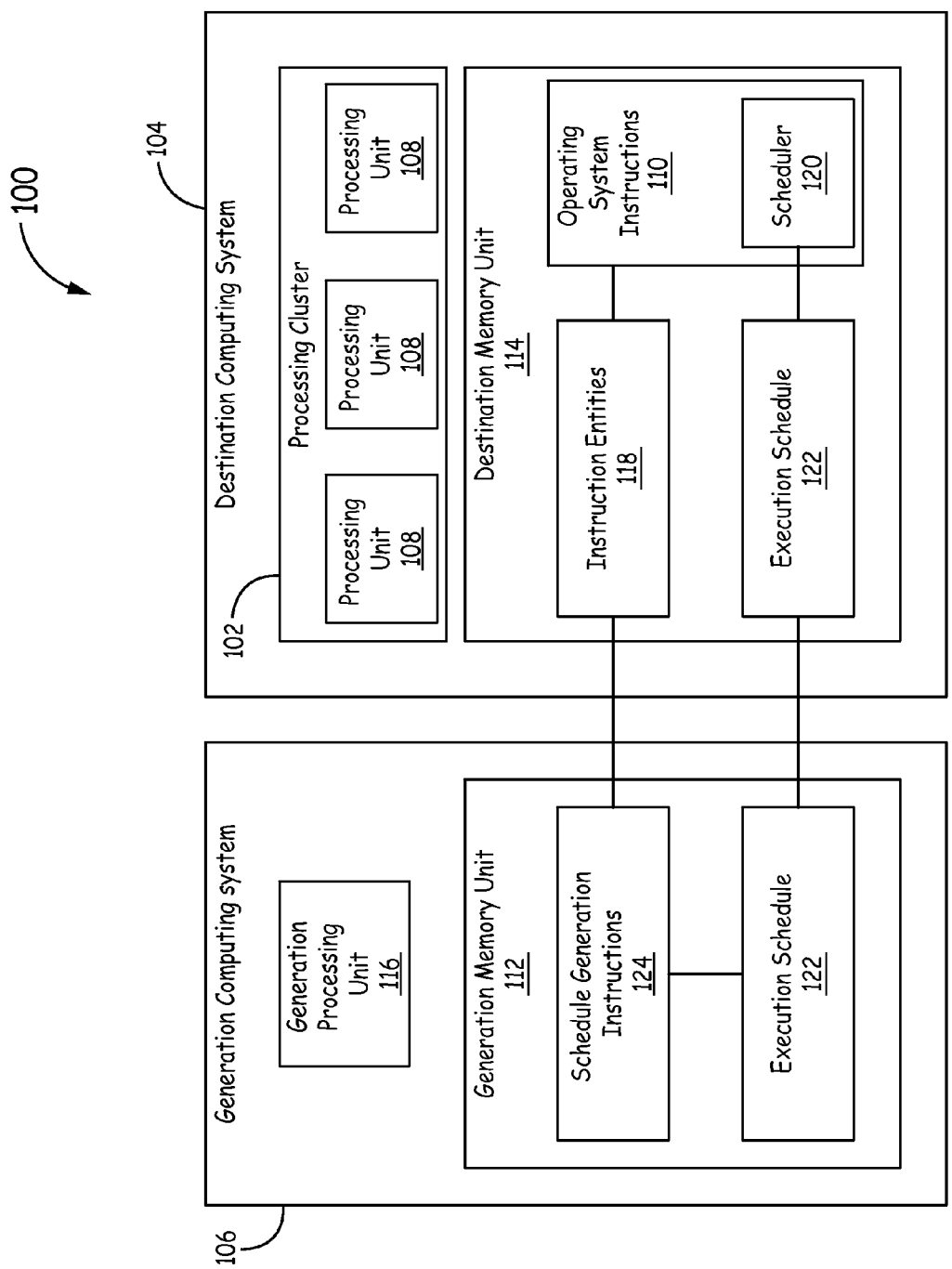
FIG. 1 is a block diagram of a system for generating instruction entity execution schedules in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In the embodiments described herein the scheduling of instruction entity executions on multiple processing units is performed by sorting multiple instruction entities into a particular order based on the budget, period, and scheduling constraints of the individual instruction entities. As used herein, the term "budget" refers to an execution time requirement for each instance of an instruction entity. The term "period" refers to the temporal periodicity of an instruction entity. For example, different instances of an instruction entity are released for execution with a time separation exactly equal to the period of the instruction entity (the time when an instance is released for execution is called the instance release time), and each instance must complete execution before an instance deadline, which is the time instant when a period has passed since the instance release time. Scheduling constraints will be described in greater detail below.

When the instruction entities have been sorted, the instruction entities are sequentially allocated to a processing unit and scheduled for execution on the processing unit according to the sorted order. Further, both the allocation and scheduling on the processing unit satisfies execution constraints for the instruction entity under consideration. When all the instruction entities have been allocated to a processing unit and scheduled for execution, execution instances of the instruction entities are allocated to execution groups, where an execution group is a group of different instruction entities that can execute on the multiple processing units during a defined period of time. The allocation of instruction entities to execution groups ensures that all constraints on instruction entity execution are satisfied while measuring and bounding the effects of executing the instruction entities on multiple processing units, as explained in more detail below.

FIG. 1 is a block diagram of a system 100 for generating an execution schedule 122 for instances of instruction entities 118, where the instruction entities 118 are executed on a processing cluster 102 in a destination computing system 104. In certain embodiments, system 100 generates the execution schedule 122 using a generation computing system 106. In an alternative embodiment, the generation computing system 106 and the destination computing system 104 are a single computing system. In at least one embodiment, both the generation computing system 106 and the destination computing system 104 of system 100 are generally implemented in embedded systems, standard computing systems, and other implementations. In the embodiments described in the present disclosure, destination computing system 104 includes at least one processing cluster 102. Processing cluster 102 includes multiple processing units 108, where a processing unit 108 is a computational device capable of accepting data and performing mathematical and logical operations as instructed by program instructions. Exemplary embodiments of a processing cluster 102 include a networked computing system, a multi-core processor, a multithreaded processing device, and the like. Alternatively, the multiple processing units 108 in system 100 can be divided into multiple processing clusters 102. (For example, a multi-core processor with four cores can contain two separate processing clusters 102, where the four cores are divided into different processing clusters 102 that each include two cores).

In the exemplary embodiment shown in FIG. 1, program instructions and data for both the generation computing system 106 and the destination computing system 104 are stored (or otherwise embodied) on or in an appropriate non-transitory storage medium or media (such as flash or other non-volatile memory, magnetic disc drives, and/or optical disc drives). For example, the generation computing system 106 includes a generation memory unit 112 and the destination computing system 104 includes a destination memory unit 114. At least a portion of the program instructions executed by processing cluster 102 are read from the destination memory unit 114 by processing units 108 in processing cluster 102 for execution thereby. Similarly, at least a portion of the program instructions executed by a generation processing unit 116 in the generation computing system 106 are read from the generation memory unit 112 for execution thereby. These program instructions are also referred to here as "software". The memory units 112 and 114 on or in which the program instructions are embodied is also referred to here as a "program product." Although the memory units 112 and 114 are shown in FIG. 1 as being included in, and local to, their respective processing units 108 and 116, it is to be understood that remote storage media (for example, storage media that are accessible over a network) and/or removable media can also be used. Memory units 112 and 114 comprise, in one implementation, any suitable form of random access memory (RAM), such as dynamic random access memory (DRAM). In other embodiments, other types of memory are used. Further, in some exemplary implementations, each processing unit in processing cluster 102 has a separate memory unit 114 dedicated to storing the program instructions on the associated processing unit 108 during execution.

In the exemplary embodiment shown in FIG. 1, destination memory unit 114 stores executable program instructions as instruction entities 118. As used herein, the term "instruction entity" refers to computer readable instructions that are to be executed by processing units 108. For example, an instruction entity can include a task, a thread, an application, a computer program, and the like. Further, the execution of instruction entities 118 is controlled by an operating system. In certain implementations, the execution of the operating system (such as a real time operating system) on the destination computing system 104 is controlled by operating system instructions 110. As part of the operating system instructions 110, destination memory unit 114 includes scheduler 120, which is a series of instructions that are executed by at least one of the processing units 108 to control when and how long instances of instruction entities 118 execute on the processing units 108 within processing cluster 102. Further, the scheduler 120 indicates to executing operating system instructions 110 on processing unit 108 when a particular instance of an instruction entity in instruction entities 118 should execute.

In certain embodiments, scheduler 120 includes a plurality of schedulers 120 where each scheduler 120 is associated with an individual processing unit 108 in processing cluster 102. Alternatively, scheduler 120 includes a plurality of schedulers 120 arranged in a master-slave relationship, where one master scheduler 120 in the plurality of schedulers 120 controls high level scheduling for all the processing units 108 in processing cluster 102 and a plurality of slave schedulers 120 associated with each processing unit 108 in processing cluster 102 controls low level scheduling of instruction entities 118 on the processing unit 108 associated with the slave scheduler 120. In a further embodiment, a single scheduler 120 controls the scheduling for all the processing units 108 in the processing cluster 102.

To determine when and where a particular instruction entity in instruction entities 118 should execute, destination memory unit 114 includes an execution schedule 122. Execution schedule 122 is a definition of when instruction entities 118 are available for execution on particular processing units 108 and by when the execution of these instruction entities 118 should complete. In at least one embodiment, the execution schedule 122 is acquired from generation computing system 106, where generation computing system 106 generates the execution schedule 122. To create the execution schedule 122, the generation memory unit 112 includes schedule generation instructions 124. The execution of schedule generation instructions 124 on generation processing unit 116 uses information describing the execution requirements and constraints of the different instruction entities in instruction entities 118 to create the execution schedule 122. When the execution schedule 122 is generated, the execution schedule 122 is communicated to the destination computing system 104 for use by the execution of the scheduler 120 when scheduling the instruction entities 118.

In certain embodiments, the schedule generation instructions 124 use information that describes scheduling constraints for the different instruction entities in instruction entities 118. For example, a scheduling constraint, as described herein, defines a relationship between different instruction entities in instruction entities 118. A scheduling constraint can be a non-parallel constraint, a parallel constraint, or a schedule-before constraint. A pair of instruction entities in instruction entities 118 is non-parallely constrained when instances of the pair of instruction entities are not scheduled to execute at the same time on different processing units 108. Instruction entities that are involved in a non-parallel relationship can be described as being within the set NP. For example, if instruction entities $\tau_i$ and $\tau_j$ are in a non-parallel relationship with one another, the non-parallel relationship can be denoted as $(\tau_i, \tau_j) \in NP$ and can be defined between two instruction entities with either the same or different periods. Further, non-parallel constraints between two instruction entities are satisfied for all pairs of instances for the two instruction entities.

A pair of instruction entities in instruction entities 118 has a parallel constraint when instances of the pair of instruction entities must be scheduled in a manner that ensures at least some of their executions run on different processing units 108 simultaneously. Instruction entities that are involved in a parallel relationship can be described as being within the set P. For example, if instruction entities $\tau_i$ and $\tau_j$ are in a parallel relationship with one another, the parallel relationship can be denoted as $(\tau_i, \tau_j) \in P$. In contrast to non-parallel constraints, parallel constraints are defined between two instruction entities that have the same period value. As with non-parallel constraints, parallel constraints are satisfied by corresponding pairs of instances of the two instruction entities, where a corresponding instance pair refers to two instances that have the same release time and deadline.

Further, a pair of instruction entities in instruction entities 118 is in a schedule-before relationship when an instance of one instruction entity must be scheduled in a manner that the one instruction entity executes before the instance of another instruction entity. Instruction entities that are involved in a schedule-before relationship can be described as being within the set B. For example, if an instance of instruction entity $\tau_i$ must execute before an instance of instruction entity $\tau_j$, and as such instruction entities $\tau_i$ and $\tau_j$ are in a schedule-before relationship with one another, the schedule-before relationship can be denoted as $(\tau_i, \tau_j) \in B$. Schedule-before constraints can be defined between any two instruction entities, irrespective of their period values. If it is defined between instruction entities that have the same period, then the constraint must be satisfied by all the corresponding instance pairs of the two instruction entities. If it is defined between instruction entities that have different period values, then there are two possible interpretations for the schedule-before constraint. For example, suppose $(\tau_i, \tau_j) \in B$, where $\tau_i$ has a period of 25 time units and $\tau_j$ has a period of 50 time units, implying that the feasible time window (release time to deadline) of each instance of $\tau_j$ overlaps with the feasible time windows of exactly two instances of $\tau_i$. In one possible implementation of the schedule-before constraint, the first overlapping instance of $\tau_i$ is scheduled before each instance of $\tau_j$. In an alternative implementation of the schedule-before constraint, the first and second overlapping instances of are scheduled before each instance of $\tau_j$. Further, if $\tau_i$ has a period of 50 time units and $\tau_j$ has a period of 25 time units, then the feasible time window (release time to deadline) of each instance of $\tau_i$ overlaps with the feasible time windows of exactly two instances of $\tau_j$. In this case, each instance of $\tau_i$ must be scheduled before both of the overlapping instances of $\tau_j$ to satisfy the constraint.

In at least one embodiment, the execution of schedule generation instructions 124 on generation processing unit 116 uses information that describes execution requirements for the different instruction entities in instruction entities 118. For example, an execution requirement, as described herein, defines system resources that an instruction entity uses to complete execution. In at least one exemplary implementation, execution requirements can include an execution period, an execution budget, and the like. In at least one scheduling algorithm, instruction entities are scheduled to execute and consume their associated execution budget once every execution period. For example, if an instruction entity has an execution period of 25 time units, an instance of the instruction entity will execute once every 25 time units. Also, in certain implementations, an instruction entity has an associated execution budget that defines the amount of execution time that would be used by an instance of an instruction entity to complete execution. In certain embodiments, the execution budget is defined by an instruction entity's worst case execution time (WCET), where the WCET is an upper bound on the longest period of execution time that an instruction entity can use to complete execution. For example, each instance of a particular instruction entity may have a WCET of 8 time units. In one exemplary implementation, the execution requirements for an instruction entity $\tau_i$ can be described as $\tau_i$=(period, budget), where a different instance of the instruction entity is executed once every period and each instance has an associated execution budget.

FIG. 2 is a table 200 illustrating execution constraints and requirements for a series of instruction entities listed in instruction entity list 202. Throughout this application, the execution constraints and requirements in table 200 will be used to provide examples for the creation of an execution schedule for instruction entities in instruction entity list 202. As illustrated, table 200 defines the execution period 204, the execution budget 206 (or WCET), schedule-before relationships 208, non-parallel relationships 210, and parallel relationships 212 for each instruction entity in instruction entity list 202. For example, table 200 defines the execution period 204 and execution budget 206 for each instruction entity in instruction entity list 202 as follows: $\tau_1=(25,8)$, $\tau_2=(25,5)$, $\tau_3=(50,16)$, $\tau_4=(50,8)$, $\tau_5=(50,5)$, $\tau_6=(50,13)$, $\tau_7=(25,12)$, and $\tau_8=(50,9)$. Further, table 200 defines the constraints on each instruction entity in instruction entity list 202 as follows: $(\tau_1,\tau_2)\in B$, $\{(\tau_2,\tau_3),(\tau_6,\tau_7)\}\in NP$, and $\{(\tau_3,\tau_4), (\tau_4,\tau_5), (\tau_6,\tau_8)\}\in P$ according to the notation described above.

Figure 3:
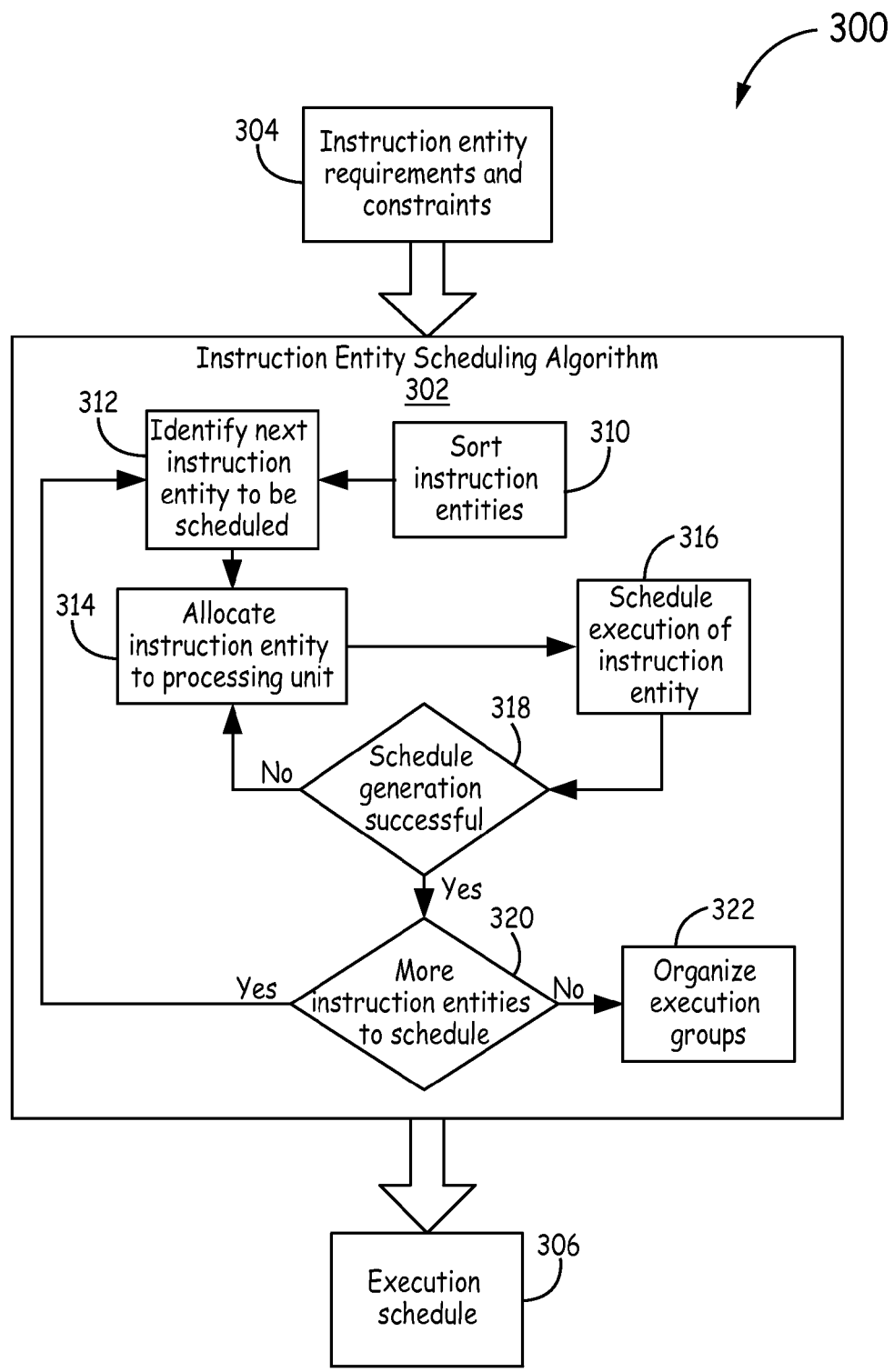
FIG. 3 is a flow diagram of an instruction entity scheduling algorithm in one embodiment described in the present disclosure.

FIG. 3 is a flow diagram 300 illustrating an instruction entity scheduling algorithm 302 for creating an execution schedule 306 of instruction entities 118 as performed by a generation processing unit 116 executing schedule generation instructions 124 in FIG. 1. In certain embodiments, the execution schedule 306 is functionally similar to the execution schedule 122. To generate the execution schedule 306, the instruction entity scheduling algorithm 302 receives instruction entity requirements and constraints 304 as inputs, where the instruction entity requirements and constraints 304 include the requirements and constraints for each instruction entity 118 to be scheduled for execution on processing units 108 in the processing cluster 102. Further, the instruction entity scheduling algorithm 302 provides an output that includes execution schedule 306. The execution schedule 306 is then used by the scheduler 120 to schedule the execution of the instruction entities 118 on the processing units 108 in the processing cluster 102.

In certain embodiments, instruction entity scheduling algorithm 302 schedules one instruction entity at a time. Further, once an instruction entity is scheduled, the schedule of the instruction entity is not adjusted to accommodate the scheduling of other instruction entities. For example, if an instruction entity $\tau_1$ is scheduled to execute at a time $T_1$, where instruction entity $\tau_1$ is scheduled before an instruction entity $\tau_2$ is scheduled, the scheduled time $T_1$ for the execution of instruction entity $\tau_1$ is not adjusted to accommodate the scheduling of instruction entity $\tau_2$. The restriction of not adjusting the schedule of previously scheduled instruction entities aids in reducing the verification and validation costs of systems that frequently undergo modifications or updates. The restriction permits the compositional verification of the modifications, without having to re-verify the previously scheduled instruction entities. Limiting the re-verification effort can lead to significant cost reductions in development of systems that must be certified for correctness such as those in avionics, automotives, and the like. Because the existing execution schedule 306 is not adjusted to accommodate the scheduling of new instruction entities, the order in which instruction entities are presented to instruction entity scheduling algorithm 302 for scheduling is important. The order can potentially determine whether a feasible execution schedule 306 can be generated for a given set of instruction entities 118 or not. Because the order of the instruction entities aids in generating a feasible schedule, instruction entity scheduling algorithm 302 first proceeds to 310 where instruction entities are sorted.

In certain embodiments, instruction entities are sorted according to the periods, budgets, parallel and schedule before constraints for the individual instruction entities. In at least one implementation, the instruction entities are sorted in three steps. In at least one step, instruction entity scheduling algorithm 302 sorts instruction entities according to their execution period, where instruction entities with the shorter execution periods are sorted for scheduling first. Instruction entities with shorter execution periods are sorted for scheduling first because there are more instances of the instruction entity to be scheduled in a given time interval. Because there are more instances of these instruction entities, scheduling the instruction entities with shorter execution periods after scheduling the instruction entities with longer execution periods may increase the difficulty in finding a feasible schedule for them. Further, scheduling instruction entities with shorter execution periods before instruction entities with longer execution periods functions similarly to the generation of a rate monotonic schedule. When instruction entities are scheduled using a rate monotonic scheduling algorithm, instruction entities with a shorter period are given a higher priority than instruction entities with a longer period. Thus, instruction entities with shorter periods are scheduled before instruction entities with longer periods.

Further, when sorting instruction entities, instruction entity scheduling algorithm 302 sorts instruction entities having the same execution period according to parallel and schedule-before constraints. To sort the instruction entities having the same execution period based on parallel and schedule-before constraints, a directed-acyclic graph that represents the parallel and schedule before constraints is created and then sorted topologically. Instruction entities that appear earlier in the topological sort are scheduled first because they impact more instruction entities through schedule-before relationships than instruction entities that appear later in the topological sort. Likewise, instruction entities involved in a parallel relationship appear next to each other in the topological sort, so that they would be considered for scheduling one after the other by the instruction entity scheduling algorithm 302. Instruction entities that are topologically indistinguishable are sorted among themselves according to budget size. In particular, the instruction entity scheduling algorithm 302 schedules instruction entities with larger budgets before instruction entities with smaller budgets, because instruction entities with larger budgets are more difficult to schedule using a contiguous allocation of execution time than instruction entities with smaller budgets.

In at least one exemplary implementation, where the instruction entities described in table 200 in FIG. 2 are sorted as described above, the instruction entities in instruction entity list 202 are sorted according to the execution period of the different instruction entities. This sort divides the instruction entities in instruction entity list 202 into two sets; a first set with an execution period of 25 time units that includes instruction entities $\tau_1$, $\tau_2$, and $\tau_7$, and a second set with an execution period of 50 time units that includes instruction entities $\tau_3$, $\tau_4$, $\tau_5$, $\tau_6$, and $\tau_8$. The instruction entities in the first set are considered for scheduling by the instruction entity scheduling algorithm 302 before the instruction entities in the second set. Next, the instruction entities in each set are sorted according to the parallel and schedule-before relationships of the instruction entities. Because only instruction entities $\tau_1$ and $\tau_2$ are in a schedule-before relationship, instruction entity $\tau_1$ is considered for scheduling by the instruction entity scheduling algorithm 302 before instruction entity $\tau_2$ is considered in the first set. In the second set, since instruction entities $\tau_3$, $\tau_4$ and $\tau_5$ have a parallel relationship with each other, they are considered one after the other by the instruction entity scheduling algorithm 306. Similarly, since instruction entities $\tau_6$ and $\tau_8$ have a parallel relationship with each other, they are also considered one after the other by the instruction entity scheduling algorithm 306. Finally, the instruction entities in each set are sorted according to execution budget. Thus, because instruction entity $\tau_7$ has a larger execution budget than instruction entity $\tau_1$, instruction entity $\tau_7$ is considered before instruction entity $\tau_1$ is considered. Further, the instruction entities in the second set with an execution period of 50 time units are sorted for scheduling based on the respective execution budgets of the instruction entities in the following order: $\tau_3$, $\tau_4$, $\tau_5$, $\tau_6$, and $\tau_8$. Thus, the instruction entities in instruction entity list 202 are sorted for scheduling in the following order: $\tau_7$, $\tau_1$, $\tau_2$, $\tau_3$, $\tau_4$, $\tau_5$, $\tau_6$, and $\tau_8$.

When the instruction entities are sorted for scheduling, instruction entity scheduling algorithm 302 proceeds to 312, where a next instruction entity to be scheduled is identified. The instruction entity scheduling algorithm 302 identifies the instruction entities to be scheduled based on the sorted order of the instruction entities. In particular, the instruction entity scheduling algorithm 302 selects the instruction entity for scheduling that is closest to the beginning of the sorted order but has not yet been scheduled. For example, using the instruction entities in instruction entity list 202 described in FIG. 2, if the instruction entity $\tau_2$ had just been scheduled, according to the sorted order described above instruction entity $\tau_3$ would be the next instruction entity to be scheduled. The instruction entity scheduling algorithm 302 iteratively proceeds through the sorted list of instruction entities.

When the next instruction entity to be scheduled is identified, the instruction entity scheduling algorithm 302 proceeds to 314 where an instruction entity is allocated to execute on a processing unit 108 within the processing cluster 102 in FIG. 1. To allocate the instruction entity for execution on a particular processing unit 108, a processing unit allocation algorithm is used. For example, the algorithm fminconset from the MATLAB user library can be used as a processing unit allocation algorithm to allocate the identified instruction entity to a particular processing unit 108. In certain embodiments, to facilitate the allocation of instruction entities to processing units 108, the processing unit allocation algorithm implements two rules. First, the processing unit allocation algorithm assigns instruction entities to processing units 108 such that instances of an instruction entity are allocated to the same processing unit 108. By allocating the instances of an instruction entity to the same processing unit 108, the execution of the instruction entity on the processing units 108 is able to avoid runtime migrations of instruction entities that would occur if different instances of the same instruction entity were executed on different processing units 108. The avoidance of runtime migrations of instruction entities aids in limiting unpredictable cache overheads associated with instruction entity migrations, which also aids in the WCET estimation process. Second, two instruction entities that are constrained by a parallel relationship are allocated such that the instances of the instruction entities are on different processing units 108. By scheduling instances of instruction entities constrained by a parallel relationship on different processing units, the satisfaction of parallel constraints on the processing cluster 102 remains feasible.

In certain embodiments, when allocating the instruction entities 118 to the different processing units 108, the processing unit allocation algorithm includes three components, which are instruction entity utilization on the processing units 108, number of processing units 108 used in the execution of the instruction entities, and previous allocations to processing units 108 that failed to generate a feasible schedule. In one exemplary implementation, when a processing unit allocation algorithm identifies an allocation that failed to generate a feasible schedule, the processing unit allocation algorithm will not re-allocate the instruction entity to the same processing unit 108. Further, the processing unit allocation algorithm attempts to limit the number of processing units 108 used by the instruction entities while balancing the processing capacity used by the instruction entities on the different processing units 108.

In one exemplary implementation of the allocation of an instruction entity to a processing unit 108, suppose an instruction entity $\tau_i$ is selected from instruction entities 118 for processing unit allocation. Let $x_{c,k}$ denote a boolean integer variable in the processing unit allocation algorithm, where c ($1 \leq c \leq m$) denotes the processing unit number and k denotes the instruction entity instance $I_{i,k}$. For each instance $I_{i,k}$, when $x_{c,k}=0$, the instance $I_{i,k}$ is not allocated to processing unit c and when $x_{c,k}=1$, the instance $I_{i,k}$ is allocated to processing unit c.

In a further embodiment, the processing unit allocation algorithm defines multiple parameters that can be altered by a user. For example, the processing unit allocation algorithm can define a max_desired_processing_units parameter that represents the desired maximum number of processing units that can be used by the processing unit allocation algorithm, such that an allocation of instruction entities does not use more than the number of processing units specified by the user. Another exemplary parameter includes max_desired_util_dif, which specifies a desired maximum difference between the maximum total instruction entity utilization on any processing unit 108 and the minimum total instruction entity utilization on any processing unit 108. A smaller value for the parameter max_desired_util_diff implies that a more balanced allocation of instruction entities 118 on the processing units 108 is desired. Also, the processing unit allocation algorithm defines variables such as failed_allocation, which is set to infinity whenever a new allocation defined by $x_{c,k}$ is identical to an allocation that previously failed to generate a feasible schedule, and 0 otherwise. Further, the processing unit allocation algorithm defines utilized_processing_units, which denotes the total number of processing units 108 being utilized together by the existing execution schedule and the new processing unit allocation defined by $x_{c,k}$. Another variable defined by processing unit allocation algorithm includes max_util_diff, which denotes the difference between the largest total instruction entity utilization on any utilized processing unit and the smallest total instruction entity utilization on any utilized processing unit, including the existing execution schedule and the new processing unit allocation defined by $x_{c,k}$. Also, the variable $alloc_{c,j,k}$ is a 0-1 boolean variable that denotes the processing unit allocation of instruction entity instance $I_{j,k}$ in the existing execution schedule. If the instance is allocated to processing unit c, then $alloc_{c,j,k}=1$, and 0 otherwise.

When the above discussed variables are defined within the processing unit allocation algorithm, the processing unit allocation algorithm can define the allocation of instruction entities to multiple processing units by implementing the following equations:

Allocation Objective:

$$\text{failed\_allocation} + \max\{0, \text{utilized\_processing\_units} - \text{max\_desired\_processing\_units}\} + \max\{0, \text{max\_util\_diff\_max\_desired\_util\_diff}\} \quad (1)$$

Subject to:

$$\sum_{c=1}^{m} x_{c,k} = 1, \forall I_{i,k} \quad (2)$$

$$x_{c,1} - x_{c,k} = 0, \forall c: 1 \leq c \leq m, \forall I_{i,k}: k \geq 2 \quad (3)$$

$$\sum_{c=1}^{m} (x_{c,k} \times alloc_{c,j,k}) = 0, \tau_j:(\tau_i, \tau_j) \in P, \forall I_{i,k} \text{ and } I_{j,k}: k \geq 1. \quad (4)$$

In the above formulation, equation (2) specifies that any instruction entity instance is allocated to a single processing unit 108, and equation (3) specifies that all the instruction entity instances associated with a single instruction entity are allocated to the same processing unit 108. Equation (4) specifies that if an instruction entity-pair participates in a parallel constraint, then instruction entity instances associated with the instruction entity pair must be allocated on different processing units. The objective function in equation (1) specifies the summation of a variable indicating whether the current allocation has failed to generate a feasible schedule in the past, the difference between the actual and desired maximum and minimum total instruction entity utilizations across processing units, and the difference between the actual and desired number of utilized processing units. In certain embodiments, the processing unit allocation algorithm attempts to minimize equation (1) while satisfying the constraints in equations (2), (3) and (4), when allocating instruction entities to processing units.

When instruction entity scheduling algorithm 302 has allocated an instruction entity to a particular processing unit 108 in processing cluster 102, the instruction entity scheduling algorithm proceeds to 316, where the execution of the instruction entity is scheduled in an execution time window on the allocated processing unit 108. For example, when an instruction entity has been allocated to a processing unit 108 by the processing unit allocation algorithm, the schedule generation algorithm 302 tries to allocate an execution time window to each of the instruction entity instances on the allocated processing unit 108. In certain embodiments, each instance is allocated a single contiguous execution window of size equal to the instruction entity's budget. This allocated execution window is denoted a scheduled time window. Further, the scheduled time window does not overlap with any other scheduled time windows on the same processing unit 108. Also, the scheduled time window satisfies all the constraints that the instruction entity participates in. For a non-parallel constraint between instruction entities $\tau_i$ and $\tau_j$, no scheduled time windows associated with instruction entity $\tau_i$ should overlap with any scheduled time windows associated with instruction entity $\tau_j$, either on the same processing unit 108 or on other processing units 108. For a schedule-before constraint from instruction entity $\tau_i$ to instruction entity $\tau_j$, the scheduled time window of some instances of instruction entity $\tau_i$ must precede the scheduled time window of some instances of instruction entity $\tau_j$, independently of the processing units 108 to which instruction entities $\tau_i$ and $\tau_j$ are assigned. The instances of $\tau_i$ and $\tau_j$ that must satisfy this schedule-before constraint depends on the period values of $\tau_i$ and $\tau_j$, as explained earlier. For a parallel constraint between instruction entities $\tau_i$ and $\tau_j$, the scheduled time window of each instance of instruction entity $\tau_i$ and the scheduled time window of the corresponding instance of instruction entity $\tau_j$ are scheduled to have identical start times. Having the same scheduled start time ensures that the executions of the two associated instances of parallelly constrained instruction entities will always (at least partially) overlap, irrespective of how much of the allocated budget they consume, as long as both instances consume non-zero budget. Scheduling the execution of instruction entities is discussed in more depth below in association with FIGS. 4 and 5.

At 318, the instruction entity scheduling algorithm 302 determines if a scheduled time window is found for the instruction entity. If a scheduled time window is found then the found scheduled time window is allocated to the instruction entity instance as its scheduled time window. Otherwise, the allocation is declared to be infeasible. An allocation is declared infeasible when there are no feasible scheduled time windows for the instance of the instruction entity being scheduled on a processing unit 108. When an allocation is declared infeasible, control is sent back to the processing unit allocation algorithm where the instruction entity is allocated to a different processing unit 108. When the processing unit allocation algorithm allocates the instruction entity to a new processing unit 108, a new scheduled time window is searched for instances of the instruction entity for execution on the newly allocated processing unit 108.

When a scheduled time window is allocated to an instruction entity instance for a particular instruction entity, the instruction entity scheduling algorithm proceeds to 320, where the instruction entity scheduling algorithm determines if there are more instruction entities in the sorted list of instruction entities to schedule. If there are more instruction entities to schedule, the instruction entity scheduling algorithm proceeds to 312 to identify the next instruction entity to be scheduled. The instruction entity scheduling algorithm 302 then allocates instances of the new instruction entity to a processing unit 108 and finds scheduled time windows for the instances of the new instruction entity without altering the scheduled time windows of any previously assigned instances of instruction entities. However, if at 320, the instruction entity scheduling algorithm determines that there are no more instruction entities to schedule, the instruction entity scheduling algorithm proceeds to 322 where execution groups are organized.

In certain embodiments, scheduled time windows for instances of instruction entity execution are partitioned into execution groups. An execution group as used herein refers to a set of instruction entities 118 that are able to concurrently execute on different processing units 108 within a processing cluster 102. In certain embodiments, the execution groups enable the use of a scheduling strategy that involves higher level scheduling among the execution groups and rate monotonic scheduling for instances of instruction entities within execution groups, where the higher level inter-group scheduling and the lower level intra-group scheduling together satisfy all the instruction entity constraints and execution requirements. This two level scheduling strategy provides scheduling flexibility that enables the use of real time operating systems such as DEOS, real time operating systems based on ARINC-653 standards like INTEGRITY and VXWORKS, and the like.

In certain embodiments, the higher level inter-group schedule specifies a temporal ordering between the different execution groups and a maximum execution duration for each execution group. At runtime, the Scheduler 120 is only required to enforce these two constraints for the higher level execution group schedule; the actual start time of an execution group can vary depending on how much of the allocation duration was utilized by the earlier scheduled execution groups. In certain embodiments, the lower level intra-group schedule specifies a rate monotonic order between the instances of instruction entities in an execution group that are allocated to the same processing unit 108. This lower level scheduler also has the ability to enforce schedule-before constraints between those instances of instruction entities.

In certain embodiments, when the instruction entity scheduling algorithm 302 assigns scheduled time windows to the different instances of instruction entity execution, the instruction entity scheduling algorithm 302 generates a cyclic and static schedule of instruction entity execution, where a cyclic schedule is a schedule in which, for each instruction entity, the scheduled time window of any instance of the instruction entity starts at the same offset from the instance release time as the scheduled time window of any other instance of the instruction entity. However, organizing instances of instruction entity execution into execution groups applies not only when the generated schedule is cyclic but also when the schedule is static but not cyclic.

In certain embodiments, when organizing instruction entity instances into execution groups and scheduling the instances using the two level scheduling strategy described above, non-parallel, parallel, and schedule-before constraints are satisfied. To illustrate how the different scheduling constraints are satisfied, consider a pair of instruction entities $\tau_i$, $\tau_j$, and the type of scheduling constraint that constrains instruction entities $\tau_i$ and $\tau_j$. The type of constraints between instruction entities $\tau_i$ and $\tau_j$ and their allocation to processing units 108 affects how the different instruction entities are organized into different execution groups. For example, when there is no constraint between instruction entities $\tau_i$ and $\tau_j$, the instances of instruction entity execution can be in the same or different execution groups, irrespective of whether they are allocated to the same processing unit 108. Essentially, when there are no constraints between instruction entities $\tau_i$ and $\tau_j$, there are likewise no restrictions on the organization of instances of instruction entity execution into execution groups.

Further, if instruction entities $\tau_i$ and $\tau_j$ are involved in a schedule-before constraint, then the organization of instruction entities $\tau_i$ and $\tau_j$ into different execution groups is constrained by whether instruction entities $\tau_i$ and $\tau_j$ are allocated to the same processing unit 108. If instruction entities $\tau_i$ and $\tau_j$ are allocated to the same processing unit 108, then the schedule-before constraint between instruction entities $\tau_i$ and $\tau_j$ does not restrict the organization of instances of instruction entity execution into different execution groups. When the instruction entities $\tau_i$ and $\tau_j$ are in different execution groups, the instances of instruction entity execution in one group will execute before the instances of instruction entity execution in the other group on account of the temporal ordering by the higher level inter-group schedule. If the instances of instruction entity execution are in the same execution group, the scheduler 120 will schedule the intra-group instances of instruction entities $\tau_i$ and $\tau_j$ such that the schedule-before constraint is satisfied. Conversely, if instruction entities $\tau_i$ and $\tau_j$ are allocated to different processing units 108, then the corresponding instances must also be allocated to different execution groups so that the schedule-before constraint can be satisfied by the higher level inter-group schedule using the temporal ordering between groups. The instruction entity scheduling algorithm 302 ensures that the created instruction entity execution schedule satisfies the schedule-before constraint between instances of instruction entities $\tau_i$ and $\tau_j$, and therefore $\tau_i$ would be allocated to an execution group that is scheduled before the execution group to which $\tau_j$ is allocated.

If instruction entities $\tau_i$ and $\tau_j$ are involved in a non-parallel constraint, then the grouping strategies are identical to the strategies described above when instruction entities $\tau_i$ and $\tau_j$ are constrained by a schedule-before relationship. In particular, there are no constraints on the organization of execution groups if instruction entities $\tau_i$ and $\tau_j$ are allocated to the same processing unit 108. Also, instances of the instruction entities $\tau_i$ and $\tau_j$ are in different groups if the instruction entities $\tau_i$ and $\tau_j$ are allocated to different processing units 108. When the instruction entities $\tau_i$ and $\tau_j$ are allocated to the same processing unit 108, then the non-parallel constraint is automatically satisfied because the instruction entities $\tau_i$ and $\tau_j$ can never execute in parallel. If the instruction entities $\tau_i$ and $\tau_j$ are allocated to different processing units 108, then the instruction entity scheduling algorithm 302 will ensure that the created instruction entity execution schedule satisfies the non-parallel constraint between instances of instruction entities $\tau_i$ and $\tau_j$ by ensuring that instruction entities $\tau_i$ and $\tau_j$ are not scheduled in parallel. Then, since the instruction entities will be assigned to different execution groups, they will not be scheduled to run in parallel.

If instruction entities $\tau_i$ and $\tau_j$ are involved in a parallel constraint, then the organization of instruction entities $\tau_i$ and $\tau_j$ into different execution groups is constrained because instruction entities $\tau_i$ and $\tau_j$ cannot be allocated to the same processing unit 108. To ensure that at least a portion of the scheduled time windows overlap for the instances of instruction entities $\tau_i$ and $\tau_j$, the instruction entities $\tau_i$ and $\tau_j$ are allocated to different processing units. Further, the corresponding instances of instruction entities $\tau_i$ and $\tau_j$ are allocated to the same execution group to satisfy the parallel constraint. Also, the start time of the time window allocated to the execution group containing the corresponding instances of instruction entities $\tau_i$ and $\tau_j$ coincides with the scheduled start time of the corresponding instances for instruction entities $\tau_i$ and $\tau_j$. In at least one implementation, the duration of the time window allocated to the group is equal to the time window allocated to the instruction entity instance that has the smaller of the two instruction entity execution budgets to ensure that at least some execution overlap occurs between the two instruction entity instances.

In exemplary embodiments contained herein, the instruction entity scheduling algorithm 302 provides an execution schedule by sorting instruction entities, allocating the instances of instruction entity execution to the processing units 108 in a processing cluster 102, and scheduling the execution of the instruction entity instances on their allotted processing unit 108. Further, the instruction entity scheduling algorithm 302 also assigns instances of instruction entity execution to different execution groups. Through the strategy of allocating instruction entities to processing units, scheduling the execution of the instruction entities, and assigning the instances of instruction entity execution to different execution groups, the instruction entity scheduling algorithm 302 is able to ensure that the produced execution schedule 306 satisfies both the execution requirements for the instances of instruction entity execution and the scheduling constraints for the different instruction entities that execute on the multiple processing units 108 in a processing cluster 102. The individual steps of instruction entity scheduling algorithm 302 are described in greater detail below in FIGS. 4-9.

Figure 4:
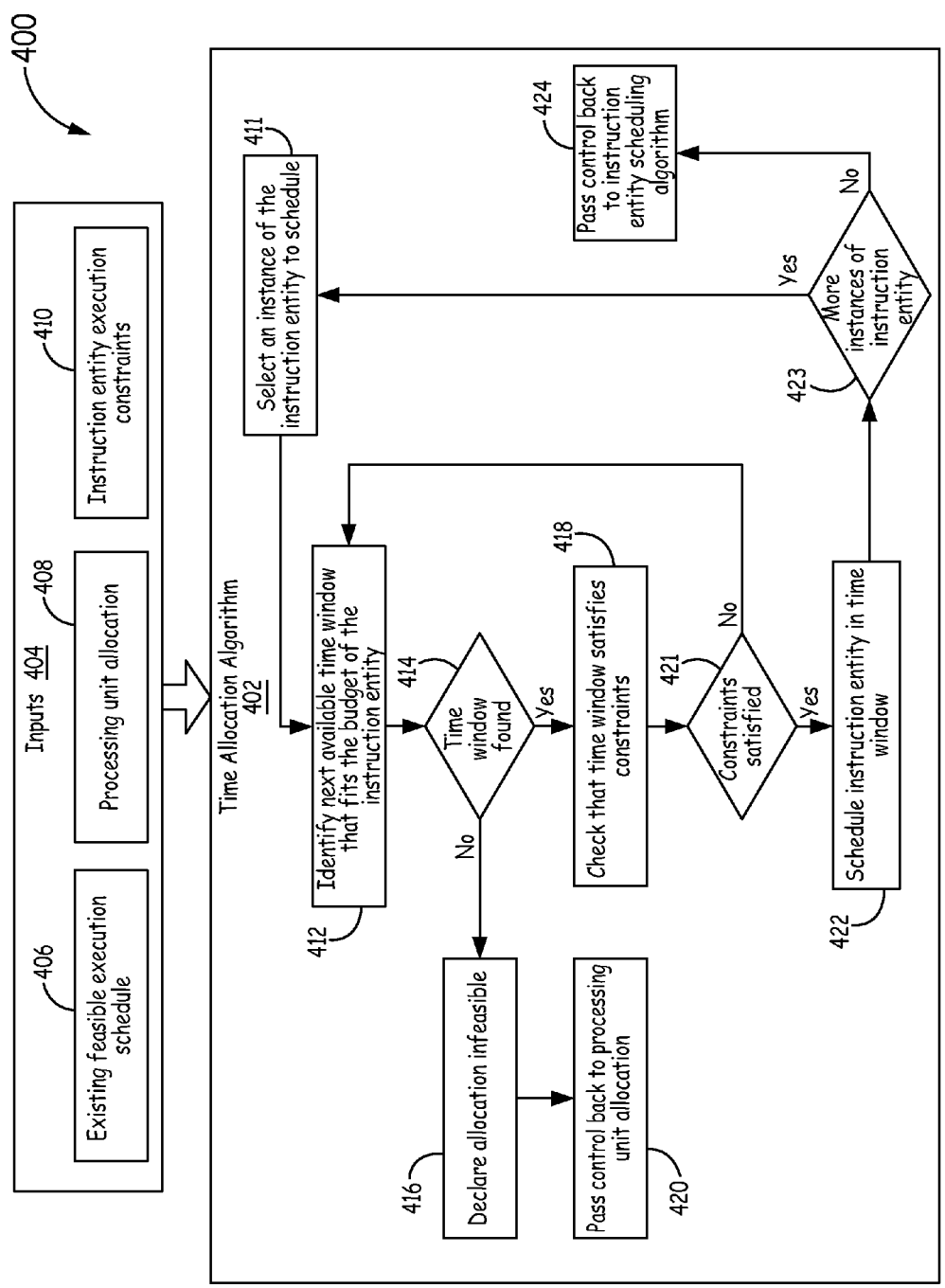
FIG. 4 is a flow diagram of a time allocation algorithm in one embodiment described in the present disclosure.

FIG. 4 is a flow diagram of a time allocation algorithm 402 for scheduling an instance of instruction entity execution on an allocated processing unit 108. Time allocation algorithm 402 includes multiple inputs 404. These inputs include the existing feasible execution schedule 406, an indication of processing unit allocation 408, and instruction entity execution constraints 410. The existing feasible execution schedule 406 is a schedule that contains previously scheduled instances of other instruction entities. The indication of processing unit allocation 408 is an indication received from the processing unit allocation algorithm 314 that indicates to which processing unit 108 the instances of the current instruction entity should be scheduled. The instruction entity execution constraints 410 include a list of the constraints and requirements that control the execution of the current instruction entity instances.

The time allocation algorithm 402 uses the inputs and proceeds at 411, where the time allocation algorithm 402 selects an instance of the instruction entity to schedule. It then proceeds at 412 where the next available time window that fits the budget of the instruction entity is identified. In one exemplary implementation, the time allocation algorithm 402 scans an execution timeline for the processing unit 108 identified in the processing unit allocation 408. The time allocation algorithm 402 identifies the first available time window that lies between the release time and deadline of the selected instance of the instruction entity and is large enough to fit the execution budget of the instruction entity. At 414, the time allocation algorithm 402 determines whether a time window was found that fits the execution budget of the instruction entity and lies between the release time and deadline of the selected instance. If the time allocation algorithm 402 fails to identify such a time window, the time allocation algorithm 402 proceeds to 416 and declares that the processing unit allocation is infeasible, meaning that a time window having a sufficient budget that satisfies the required constraints was not found. When the time allocation algorithm 402 declares an allocation infeasible, the time allocation algorithm 402 proceeds to 420 and passes control back to the processing unit allocation algorithm 314 to identify a different processing unit 108 for scheduling the execution of the instruction entity.

In contrast to declaring a processing unit allocation 408 infeasible when no time window is found at 414, when the time allocation algorithm 402 finds a feasible time window, the time allocation algorithm 402 proceeds to 418 where the time allocation algorithm 402 checks that the time window satisfies the instruction entity execution constraints 410. In one exemplary implementation, the time allocation algorithm 402 checks the non-parallel constraints, the schedule-before constraints, and then the parallel constraints. When the time allocation algorithm 402 determines whether the time window found for an instance of an instruction entity $\tau_i$ violates any of the non-parallel constraints involving instruction entities $\tau_i$ and $\tau_j$, the time allocation algorithm 402 verifies that the time window allotted to the instance of instruction entity $\tau_i$ does not overlap in time with the scheduled time windows of instances of instruction entity $\tau_j$. Similarly, the time allocation algorithm 402 checks whether the time window violates any of the schedule-before constraints in which instruction entity $\tau_i$ must be scheduled after some other instruction entity $\tau_j$. As discussed above, in regards to the FIG. 3 at step 310, the instruction entities are sorted such that if instruction entity $\tau_j$ must execute before $\tau_i$, all of the instances of instruction entity $\tau_j$ would be scheduled before any instance of instruction entity $\tau_i$ is considered by the time allocation algorithm 402. Thus, the time allocation algorithm 402 can check for the violation of schedule-before constraints between instances of instruction entities $\tau_i$ and $\tau_j$. Also, the time allocation algorithm 402 checks whether the time window satisfies all the parallel constraints involving instruction entity $\tau_i$. For example, to ensure that a parallel constraint involving instruction entities $\tau_i$ and $\tau_j$ is satisfied, the time allocation algorithm 402 ensures that corresponding instances of the two instruction entities $\tau_i$ and $\tau_j$ are scheduled to start executing at the same time instant. That is, instances $I_{i,k}$ and $I_{j,k}$, for all k, must have identical start times for their scheduled time windows. Since instruction entity instances can execute for less than the scheduled time duration, to guarantee a non-zero overlap in executions, it is necessary to simultaneously start the execution of instances participating in a parallel constraint. If the time allocation algorithm 402 finds that a constraint is not satisfied, the time allocation algorithm 402 returns to 412 to identify a different time window that fits the budget of the instruction entity. However, if the time allocation algorithm 402 finds that the time window satisfies all the constraints, the time allocation algorithm 402 proceeds to 422 and sets the time window as the scheduled time window for the selected instance of the instruction entity. The time allocation algorithm 402 then checks whether more instances of the instruction entity need to be scheduled at 423. If more instances of the instruction entity need to be scheduled, then the time allocation algorithm 402 proceeds to 411 to select the next instance. Otherwise, the time allocation algorithm 402 returns control to the instruction entity scheduling algorithm 302 in FIG. 3 at 424.

As has been stated, the time allocation algorithm 402 does not adjust the schedule of already allocated instruction entities to the execution schedule to accommodate a new instruction entity. By maintaining the previously allocated schedule, the re-certification costs are reduced by limiting the impact of application changes on the execution schedule.

Figure 5:
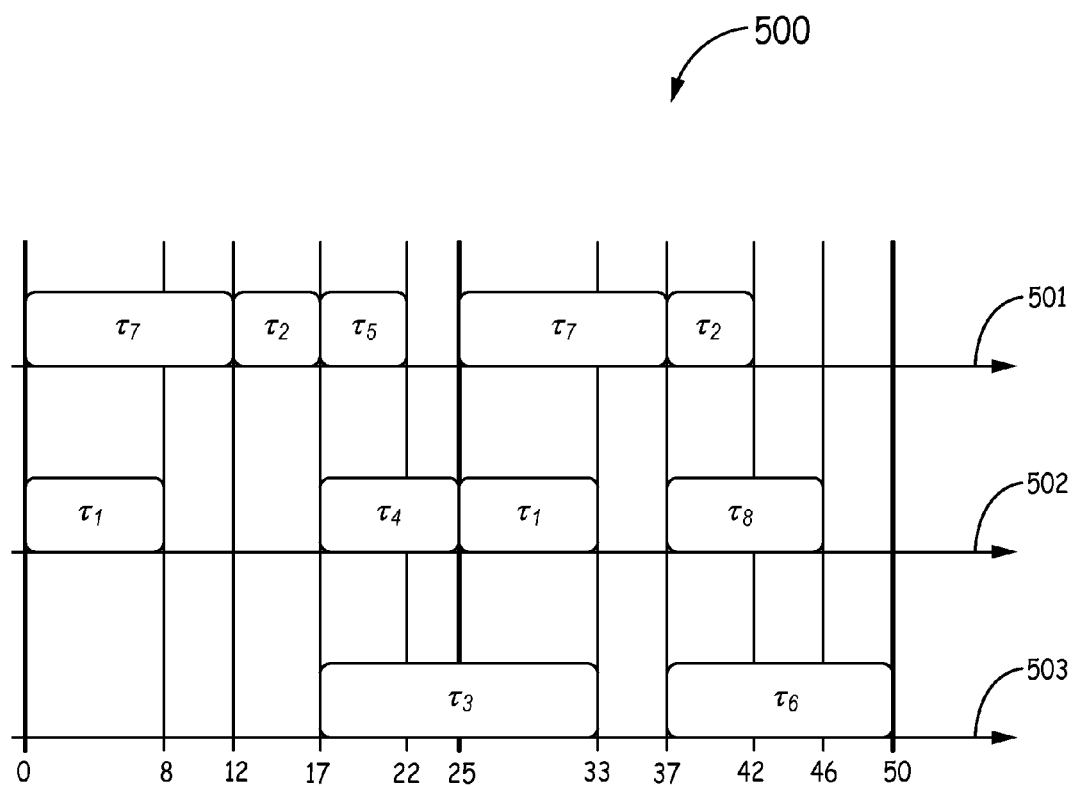
FIG. 5 is an execution schedule for instruction entities in one embodiment described in the present disclosure.

FIG. 5 is a diagram illustrating an exemplary feasible execution schedule 500 of the instruction entities in exemplary instruction entity list 202 described in relation to FIG. 2 after being scheduled by the exemplary instruction entity scheduling algorithm 302 in FIG. 3. As illustrated, the different instruction entities execute on different processing units 108 in processing cluster 102, where each processing unit 108 has an associated execution timeline 501, 502, and 503. As described in relation to FIG. 2, instruction entity list 202 includes 8 instruction entities that are defined as follows: $\tau_1=(25,8)$, $\tau_2=(25,5)$, $\tau_3=(50,16)$, $\tau_4=(50,8)$, $\tau_5=(50,5)$, $\tau_6=(50,13)$, $\tau_7=(25,12)$, and $\tau_8=(50,9)$. Further, table 200 defines the constraints on each instruction entity as follows: $(\tau_1,\tau_2) \in B$, $\{(\tau_2,\tau_3),(\tau_6,\tau_7)\} \in S$, and $\{(\tau_3,\tau_4), (\tau_4,\tau_5), (\tau_6,\tau_8)\} \in P$. Based on the sorting strategy described above in relation to FIG. 3, the instruction entities in instruction entities 202 are considered by the processing unit allocation algorithm 314 and the time allocation algorithm 402 in the following order: $\tau_7, \tau_1, \tau_2, \tau_3, \tau_4, \tau_5, \tau_6$, and $\tau_8$.

In scheduling instruction entity $\tau_7$, the processing unit allocation algorithm 314 allocates instruction entity $\tau_7$ to a first processing unit 108 having an associated first execution timeline 501. As there are no other instruction entities yet scheduled on the first execution timeline 501, the time allocation algorithm 402 finds the first available time window at time 0 (T(0)) and assigns the first instance of instruction entity $\tau_7$ at T(0) with an accompanying time window equal to the length of the execution budget, which is 12 time units. Thus, the first instance of instruction entity $\tau_7$ is scheduled to execute within a time window on first execution timeline 501 that begins at T(0) and ends at T(12). Because the execution period of instruction entity $\tau_7$ is 25 time units, a second instance of instruction entity $\tau_7$ is also scheduled to execute within a time window on the first execution timeline 501 that begins at T(25) and ends at T(37). After instruction entity $\tau_7$ is scheduled, the instruction entity scheduling algorithm 302 proceeds to schedule instruction entity $\tau_1$.

In scheduling instruction entity $\tau_1$, the processing unit allocation algorithm 314 allocates instruction entity $\tau_1$ to a second processing unit 108 having an associated second execution timeline 502. As there are no other instruction entities yet scheduled on the second execution timeline 502, the time allocation algorithm 402 finds the first available time window at T(0) and assigns the first instance of instruction entity $\tau_1$ at T(0) with an accompanying time window equal to the length of the execution budget of instruction entity $\tau_1$, which is 8 time units. Thus, the first instance of instruction entity $\tau_1$ is scheduled to execute within a time window on the second execution timeline 502 that begins at T(0) and ends at T(8). Because the execution period of instruction entity $\tau_1$ is 25 time units, a second instance of instruction entity $\tau_1$ is also scheduled to execute within a time window on the second execution timeline 502 that begins at T(25) and ends at T(33). After instruction entity $\tau_1$ is scheduled, the instruction entity scheduling algorithm 302 proceeds to schedule instruction entity $\tau_2$.

In scheduling instruction entity $\tau_2$, the processing unit allocation algorithm 314 allocates instruction entity $\tau_2$ to the first processing unit 108 having the associated first execution timeline 501. As instruction entity $\tau_7$ is already scheduled to execute on first execution timeline 501, the time allocation algorithm 402 finds the first available time window at T(12) and assigns the first instance of instruction entity $\tau_2$ at T(12) with an accompanying time window equal to the length of the execution budget of instruction entity $\tau_2$, which is 5 time units. Thus, the first instance of instruction entity $\tau_2$ is scheduled to execute within a time window on the first execution timeline 501 that begins at T(12) and ends at T(17). Because the execution period is 25 time units, a second instance of instruction entity $\tau_2$ is also scheduled to execute within a time window on the first execution timeline 501 that begins at T(37) and ends at T(42). When time allocation algorithm 402 finds a time window, the time allocation algorithm 402 verifies that the time window satisfies the constraints involving instruction entity $\tau_2$. Instruction entity $\tau_2$ must execute after instruction entity $\tau_1$ executes due to a schedule-before relationship between instruction entities $\tau_1$ and $\tau_2$. Thus, the time allocation algorithm 402 verifies that each instance of instruction entity $\tau_2$ executes after a corresponding instance of instruction entity $\tau_1$. The first instance of instruction entity $\tau_1$ executes between T(0) and T(8) and the first instance of instruction entity $\tau_2$ executes between T(12) and T(17). Also, the second instance of instruction entity $\tau_1$ executes between T(25) and T(33) and the second instance of instruction entity $\tau_2$ executes between T(37) and T(42). Because each instance of instruction entity $\tau_2$ executes after the corresponding instance of instruction entity $\tau_1$, the schedule-before relationship is satisfied. After instruction entity $\tau_2$ is scheduled, the instruction entity scheduling algorithm 302 proceeds to schedule instruction entity $\tau_3$.

In scheduling instruction entity $\tau_3$, the processing unit allocation algorithm 314 may allocate instruction entity $\tau_3$ to the second processing unit 108 having the associated second execution timeline 502. On the second execution timeline 502, a time window exists that fits the execution budget of instruction entity $\tau_3$, which has a duration of 16 time units. Specifically, an instance of instruction entity $\tau_3$ can execute between T(8) and T(24). However, when verifying the constraints, instruction entity $\tau_3$ is involved in a non-parallel constraint with instruction entity $\tau_2$, and the scheduled time window of the first instance of instruction entity $\tau_2$ overlaps with the available time window on the second execution timeline 502. Because of the failed constraint, the processing unit allocation to the second processing unit 108 is declared infeasible. Due to the infeasibility of allotting a time window on the second execution timeline 502, the processing unit allocation algorithm 314 then allocates instruction entity $\tau_3$ to the third execution timeline 503. As discussed above, the time allocation algorithm 402 will consider time windows with a duration of 16 time units starting from T(0). However, the first time instant when the resulting window will satisfy all the constraints for instruction entity $\tau_3$ is T(17) due to the non-parallel relationship with instruction entity $\tau_2$. Thus, instruction entity $\tau_3$ is scheduled to execute in the time window beginning at T(17) and ending at T(33). Because the period of instruction entity $\tau_3$ has a duration of 50 time units, only one instance of instruction entity $\tau_3$ is scheduled. After instruction entity $\tau_3$ is scheduled, the instruction entity scheduling algorithm proceeds to schedule instruction entities $\tau_4$ and $\tau_5$.

In scheduling instruction entities $\tau_4$ and $\tau_5$, the time allocation algorithm 402 considers the parallel constraint that requires instruction entities $\tau_3$, $\tau_4$, and $\tau_5$ to execute in parallel. To ensure that parallel constrained instruction entities execute in parallel, the execution of the instruction entities must be scheduled to begin execution simultaneously on different execution time lines. Because instruction entity $\tau_3$ is already scheduled to begin execution at time window T(17), instruction entities $\tau_4$ and $\tau_5$ are also assigned to time windows that begin at T(17). For example, the first instance of instruction entity $\tau_4$ is scheduled to execute at time window T(17):T(25) on execution timeline 502 and the first instance of instruction entity $\tau_5$ is scheduled to execute at time window T(17):T(22) on execution timeline 501. Since there are no other constraints involving instruction entities $\tau_4$ and $\tau_5$, the selected time windows are assigned as scheduled time windows to the instances of instruction entities $\tau_4$ and $\tau_5$. After instruction entities $\tau_4$ and $\tau_5$ are scheduled, the instruction entity scheduling algorithm 302 proceeds to schedule instruction entity $\tau_6$.

In scheduling instruction entity $\tau_6$, the time allocation algorithm 402 considers both a non-parallel constraint with instruction entity $\tau_7$ and a parallel constraint with instruction entity $\tau_8$. Due to the constraints, time allocation algorithm 402 identifies a time window in which both the instruction entities $\tau_6$ and $\tau_8$ can begin executing at the same time and a time window in which the execution of instruction entities $\tau_6$ and $\tau_7$ do not overlap. Because instances of instruction entity $\tau_7$ are already scheduled to execute in time windows T(0):T(12) and T(25):T(37), the execution budget of instruction entity $\tau_6$, which is 13 time units, can only be executed at one of the time windows T(12):T(25) or T(37):T(50). However, due to the parallel constraint, the time window must have a corresponding time window in a different execution timeline in which instruction entity $\tau_8$ can be scheduled to begin execution at the same time. Because of the previously scheduled instruction entities $\tau_2$ and $\tau_3$, the time window T(12):T(25) does not provide a feasible time window for the execution of instruction entities $\tau_6$ and $\tau_8$, because one of the instruction entities would be allocated a scheduled time window on execution timeline 503 that would overlap with the scheduled time window of instruction entity $\tau_3$. Therefore, the time window of T(12):T(25) is infeasible for the execution of instruction entity $\tau_6$ and hence the instruction entity is allocated an execution time window that commences at T(37). The instruction entity $\tau_6$ can be allocated to one of the execution timelines 502 or 503 as determined by the processing unit allocation algorithm 314. For example, instruction entity $\tau_6$ is assigned to a scheduled time window on execution timeline 503 that begins at T(37) and ends at T(50). Instruction entity $\tau_8$ must begin execution at the same time as instruction entity $\tau_6$ due to the parallel constraint involving instruction entities $\tau_6$ and $\tau_8$. Because the only available time window that satisfies the constraints is available at T(37):T(46) on execution time line 502, the execution of instruction entity $\tau_8$ is assigned the scheduled time window T(37):T(46) on execution time line 502. After scheduling instruction entity $\tau_8$.

Figure 6:
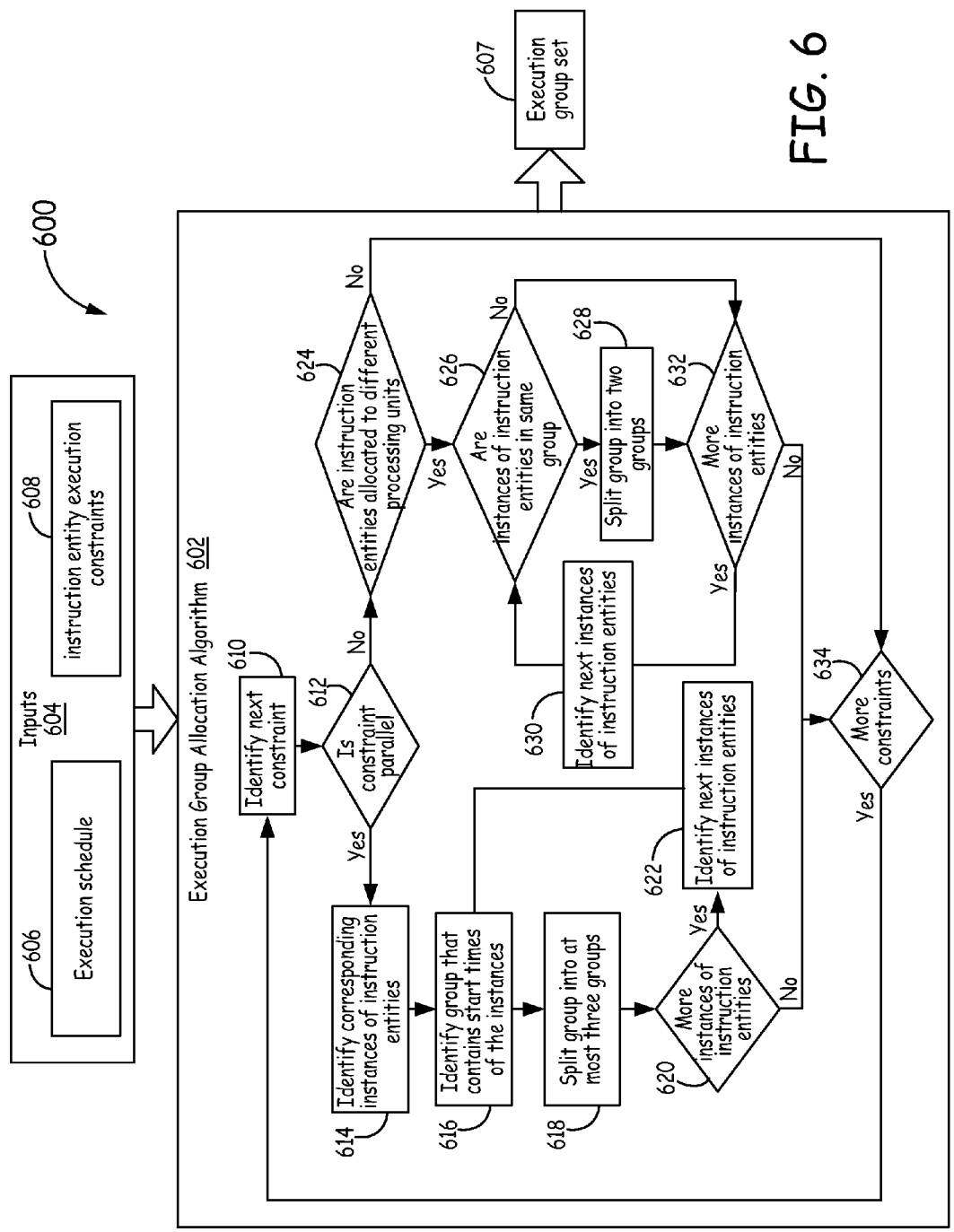
FIG. 6 is a flow diagram of an execution group allocation algorithm in one embodiment described in the present disclosure.

In certain embodiments, the final schedule of instruction entities $\tau_1$, $\tau_2$, $\tau_3$, $\tau_4$, $\tau_5$, $\tau_6$, $\tau_7$, and $\tau_8$ can be cyclic with a period of 50 time units. When a final schedule is found that is feasible, the time allocation algorithm 402 produces an execution schedule. The execution schedule is used to allocate the instances of the instruction entities to different execution groups. FIG. 6 is a flow diagram 600 of an exemplary execution group allocation algorithm 602. Execution group allocation algorithm 602 receives inputs 604 that include the instruction entity execution schedule 606 and instruction entity execution constraints 608. The execution group allocation algorithm 602 steps through the different constraints in instruction entity execution constraints 608 when allocating the instances of instruction entity execution to different execution groups. Initially, the execution group allocation algorithm 602 allocates all instruction entity instances to a single execution group. Further, in at least one exemplary embodiment, the execution group allocation algorithm 602 begins at 610, where the execution group allocation algorithm 602 identifies a constraint in instruction entity execution constraints 608. After identifying the constraint, the execution group allocation algorithm 602 proceeds to 612 and determines whether the constraint is parallel.

In certain embodiments, if the execution group allocation algorithm 602 determines that the identified constraint is parallel, the execution group allocation algorithm 602 proceeds to 614, where corresponding instances of instruction entities related through the parallel constraint are identified. The execution group allocation algorithm 602 then proceeds to 616 where groups that contain the start times of the instances are identified. As described above, the time allocation algorithm 402 ensures that instruction entities that are constrained by a parallel constraint begin execution at the same time. Thus, an execution group that contains the start times of the instances is guaranteed to exist.

When the execution group allocation algorithm 602 identifies a group that contains the start times of corresponding instances of instruction entities that are associated with a parallel constraint, the execution group allocation algorithm 602 proceeds to 618, where the group is split into at most three execution groups. For example, two instances $I_i$ and $I_j$ of instruction entities that are subject to a parallel constraint have start times within a single execution group, denoted as g. Suppose the execution budget of instance $I_i$ is no more than the execution budget of instance $I_j$. If the start time of group g is the same as the start time of instances $I_i$ and $I_j$ and the duration of group g is the same as execution budget of instance $I_j$, then group g is not split into different groups. Otherwise, the group g is split into groups $g_1$, $g_2$, and $g_3$. Group $g_1$ contains all instances of instruction entities in group g that are scheduled to begin before the scheduled start time of instance $I_i$. Further, group $g_1$ has a duration that begins at the start time of g and ends at the scheduled start time of instance $I_i$. Group $g_2$ contains all instances of instruction entities in group g that are scheduled to execute during the execution of instance $I_i$. Further, group $g_2$ has a duration that begins at the start time of instance $I_i$ and ends at the scheduled completion time of instance $I_i$. Group $g_3$ contains all instances of instruction entities in group g that are scheduled to complete execution after the completion time of instance $I_i$. Further, group $g_3$ has a duration that begins at the completion time of instance $I_i$ and ends at the end time of group g.

When the execution group allocation algorithm 602 splits a group containing instances of instruction entities constrained by a parallel relationship, the execution group allocation algorithm 602 proceeds to 620 where the execution group allocation algorithm 602 determines whether there are more instances of the instruction entities constrained by the parallel relationship. If there are more instances of the instruction entities constrained by the parallel relationship, the execution group allocation algorithm 602 proceeds to 622, where the next corresponding instances of instruction entities are identified. After identifying the next corresponding instances of the instruction entities associated with the parallel relationship, the execution group allocation algorithm 602 returns to 616 to allocate the instances to execution groups. In contrast, returning to 620, when there are no more instances of the instruction entities that have not been allocated to execution groups, the execution group allocation algorithm 602 progresses to 634 to determine if there are other constraints for allocation.

As discussed above at 612, the execution group allocation algorithm 602 determines whether a constraint is or is not a parallel constraint. When the constraint is not parallel, and is a schedule-before or a non-parallel constraint, the execution group allocation algorithm 602 proceeds to 624 and determines whether the constrained instruction entities are allocated to different processing units. If the instruction entities are not allocated to different processing units, the execution group allocation algorithm 602 proceeds to 634 and determines whether there are other constraints having instances that need to be allocated to execution groups. When the instruction entities are allocated to the same processing unit, the scheduler on the processing unit will ensure that the schedule-before constraint is satisfied. Also, when the instruction entities are allocated to the same processing unit, non-parallel constraints are automatically satisfied because the instruction entities can never execute in parallel. However, when the instruction entities are allocated to different processing units, the execution group allocation algorithm proceeds to 626 and determines whether relevant instances of the instruction entities are in the same group. If relevant instances of instruction entities are not in the same execution group, the execution group allocation algorithm 602 proceeds to 632 to determine if there are other instances to be allocated to execution groups. If the relevant instances are in the same group, the execution group allocation algorithm 602 proceeds to 628 and splits the execution group containing the relevant instances of the two instruction entities into different execution groups, where one execution group contains the instance of one instruction entity and the other execution group contains the instance of the other instruction entity.

When the execution group allocation algorithm 602 splits a group containing instances of instruction entities constrained by a non-parallel or schedule-before relationship, the execution group allocation algorithm 602 proceeds to 632 to determine whether there are more instances of the instruction entities constrained by the non-parallel or schedule-before relationship. If there are more instances of the instruction entities constrained by the non-parallel or schedule-before relationship, the execution group allocation algorithm 602 proceeds to 630, where the next instances of instruction entities are identified. After identifying the next instances of the instruction entities associated with the non-parallel or schedule-before relationship, the execution group allocation algorithm 602 returns to 626 to allocate the instances to execution groups. In contrast, returning to 632, when there are no more instances of the instruction entities that have not been allocated to execution groups, the execution group allocation algorithm 602 progresses to 634 to determine if there are other constraints for allocation. If there are more constraints, the execution group allocation algorithm 602 proceeds to 610 to identify the next constraint. If there are no more constraints, the execution group allocation algorithm 602 provides an execution group set that describes the temporal ordering between execution groups and the scheduled execution duration for each execution group within the execution group set 635.

Figure 7:
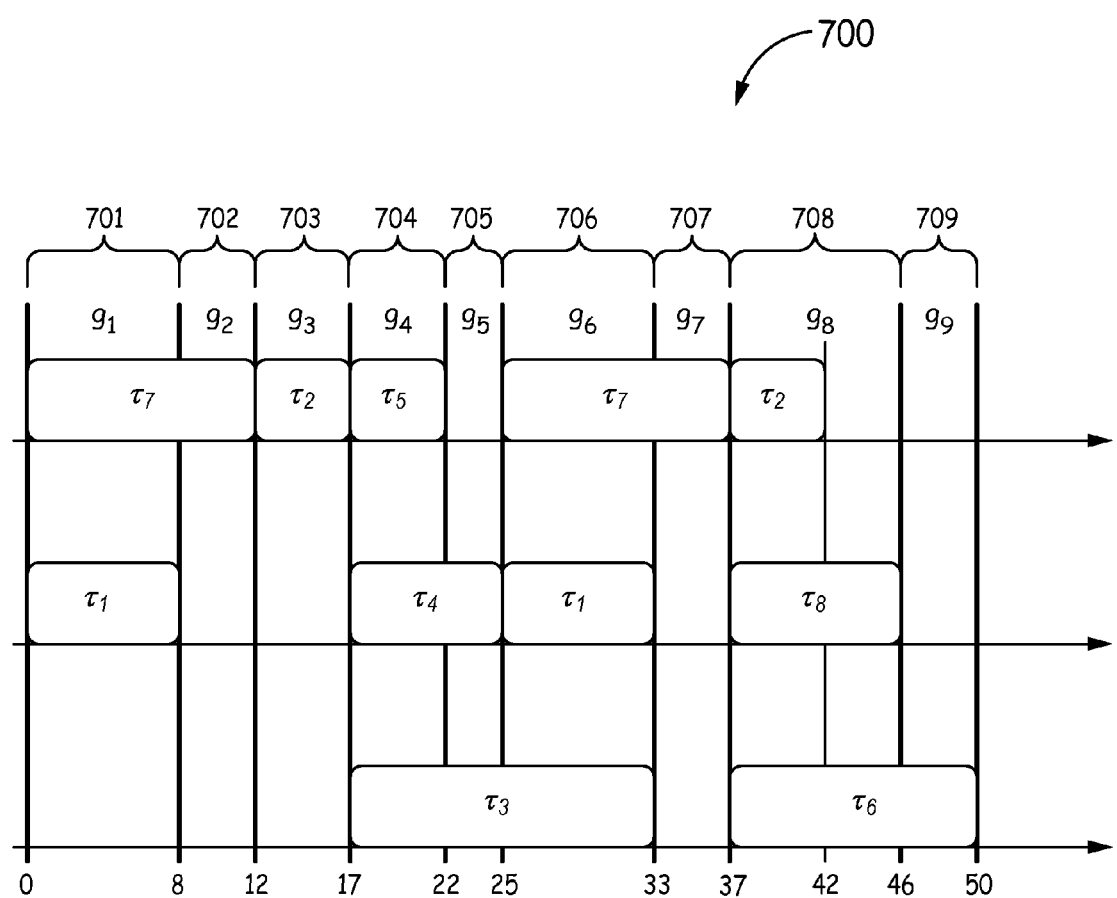
FIG. 7 is an execution schedule with instances of instruction entities allocated to execution groups in one embodiment described in the present disclosure.

FIG. 7 is an exemplary timing diagram illustrating the separation of the execution schedule from FIG. 5 into different execution groups using the execution group allocation algorithm 602 from FIG. 6. As described above in FIG. 2, the instruction entities illustrated in FIG. 7 are subject to the following constraints: $(\tau_1,\tau_2) \in B$, $\{(\tau_2,\tau_3), (\tau_6,\tau_7)\} \in S$, and $\{(\tau_3,\tau_4), (\tau_4,\tau_5), (\tau_6,\tau_8)\} \in P$. The execution group allocation algorithm 602 considers instances of instruction entities associated with each constraint. To satisfy the schedule-before constraint between instruction entities $\tau_1$ and $\tau_2$, the execution group allocation algorithm 602 forces the end time of group $g_1$ 701 (likewise group $g_6$ 706) to coincide with the scheduled completion time of instruction entity $\tau_1$ (T(8) for the first instance and T(33) for the second instance). Similarly, to satisfy the non-parallel constraint between instruction entities $\tau_7$ and $\tau_6$, the algorithm forces the end time of group $g_2$ 702 (likewise group $g_7$ 707) to coincide with the scheduled completion time of instruction entity $\tau_7$ (T(12) for the first instance and T(37) for the second instance). Similarly, to satisfy the non-parallel constraint between instruction entities $\tau_2$ and $\tau_3$, the execution group allocation algorithm 602 forces the end time of group $g_3$ 703 (likewise group $g_6$ 706) to coincide with the scheduled completion time of the first instance of instruction entity $\tau_2$ (likewise instance of instruction entity $\tau_3$). Finally, to satisfy the parallel constraint between instruction entities $\tau_4$ and $\tau_5$, the execution group allocation algorithm 602 forces the start time of group $g_4$ 704 to coincide with the scheduled start time of instruction entities $\tau_4$ and $\tau_5$ (T(17)), and the end time of $g_4$ 704 to coincide with the scheduled completion of instruction entity $\tau_5$ (T(22)). Similarly, to satisfy the parallel constraint between instruction entities $\tau_4$ and $\tau_3$ (likewise instruction entities $\tau_6$ and $\tau_8$), the end time of group $g_5$ 705 (likewise $g_8$ 708) is set to the scheduled completion time of instruction entity $\tau_4$ (likewise instruction entity $\tau_8$). Since the original execution schedule guarantees satisfaction of all instruction entity constraints, the instruction entities can also be feasibly scheduled using the generated groupings and the two level inter- and intra-group scheduling strategy described above. The inter-group schedule must maintain the temporal ordering between execution groups and the maximum execution duration for each group as specified in the execution group set 635. For intra-group scheduling, multiple scheduling algorithms can be used to schedule instruction entities. In at least one embodiment, since the instruction entity periods are harmonic with each other, where the different periods are integer multiples of a base period, using rate monotonic as the intra-group scheduler within each group ensures the satisfaction of all the instruction entity deadlines.

Figure 8:
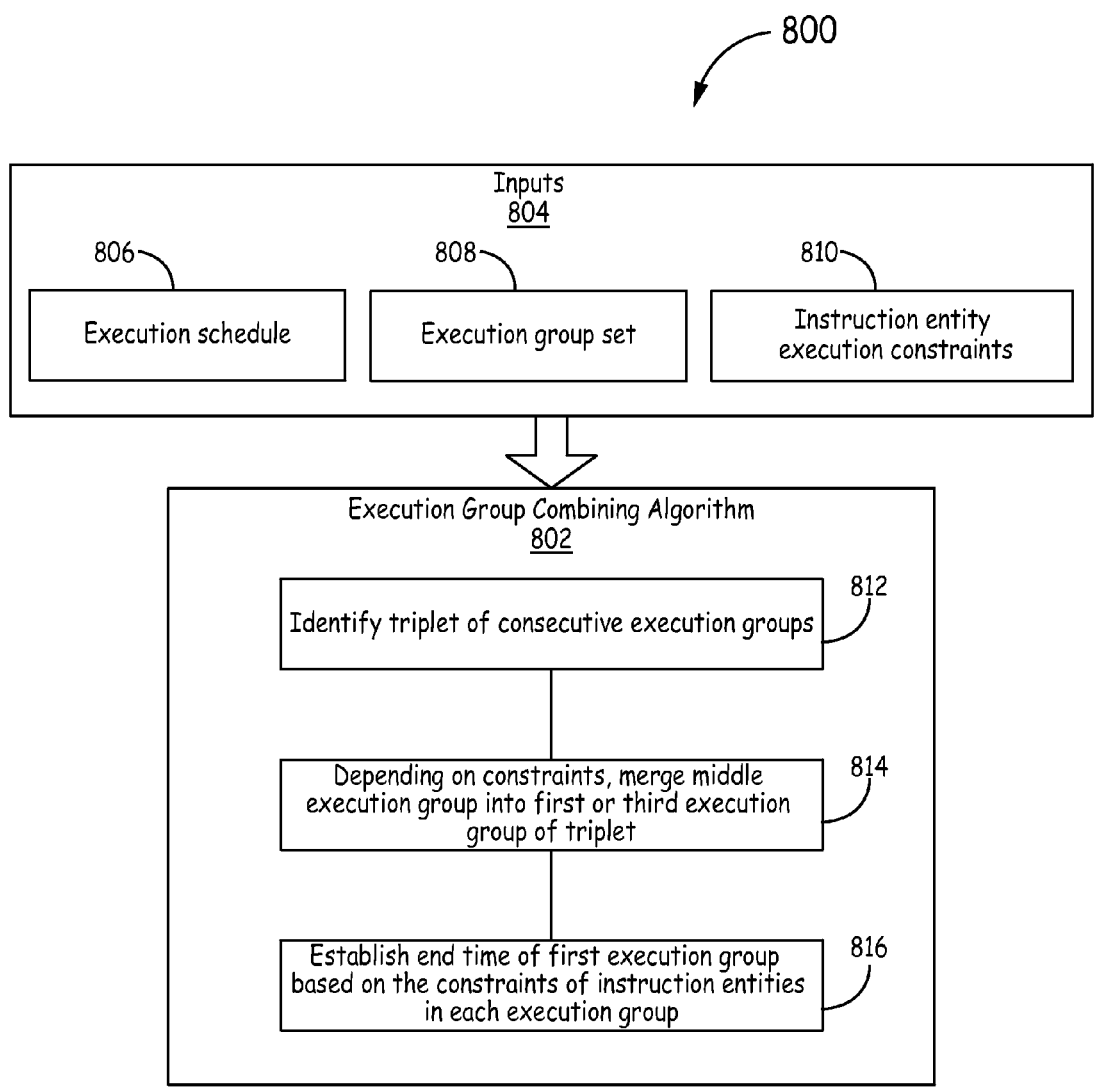
FIG. 8 is a flow diagram of an execution group combining algorithm in one embodiment described in the present disclosure.

However, some groups generated by the execution group allocation algorithm 602 are redundant in that the instruction entity execution constraints are already satisfied by other groups. FIG. 8 is a flow diagram 800 of an execution group combining algorithm 802. The execution group combining algorithm 802 eliminates redundant execution groups. In at least one embodiment, the execution group combining algorithm receives multiple inputs 804. For example, the execution group combining algorithm 802 receives an execution schedule 806, an execution group set 808, and instruction entity execution constraints 810.

The execution group combining algorithm 802 begins at 812, where a triplet of consecutive execution groups is identified. Then, the execution group combining algorithm 802 proceeds to 814 where an attempt is made to merge the middle execution group into the first or third execution group of the triplet. For example, the execution group combining algorithm 802 takes three groups at a time, and tries to eliminate the one in the middle by adjusting the end and start times of the first and last groups respectively. If the merge is feasible, in that no instruction entity execution constraint is violated by the merge, the execution group combining algorithm 802 then proceeds to 816 where the end time of the first execution group (and also the start time of the third execution group in the triplet) is established based on the constraints of instruction entities in the triplet of execution groups. For example, with non-parallel and schedule-before group constraints, the execution group combining algorithm 802 ensures that elimination of the middle group does not violate the non-parallel and schedule-before constraints. For each instruction entity instance pair involved in a parallel constraint, the execution group combining algorithm 802 ensures that modifications to the groups do not violate the requirement that a group start time should coincide with the scheduled start time of the instruction entity instances. The execution group combining algorithm 802 also ensures that new instruction entity instances included in this group as a result of the modifications do not have a release time earlier than the start time of the group, which guarantees that the instruction entity instances involved in the parallel constraint would be the instances having the highest priority scheduled at the start of the group, irrespective of the chosen intra-group scheduler. Hence, instruction entity instances can be scheduled to run in parallel according to the associated constraint.

Figure 9:
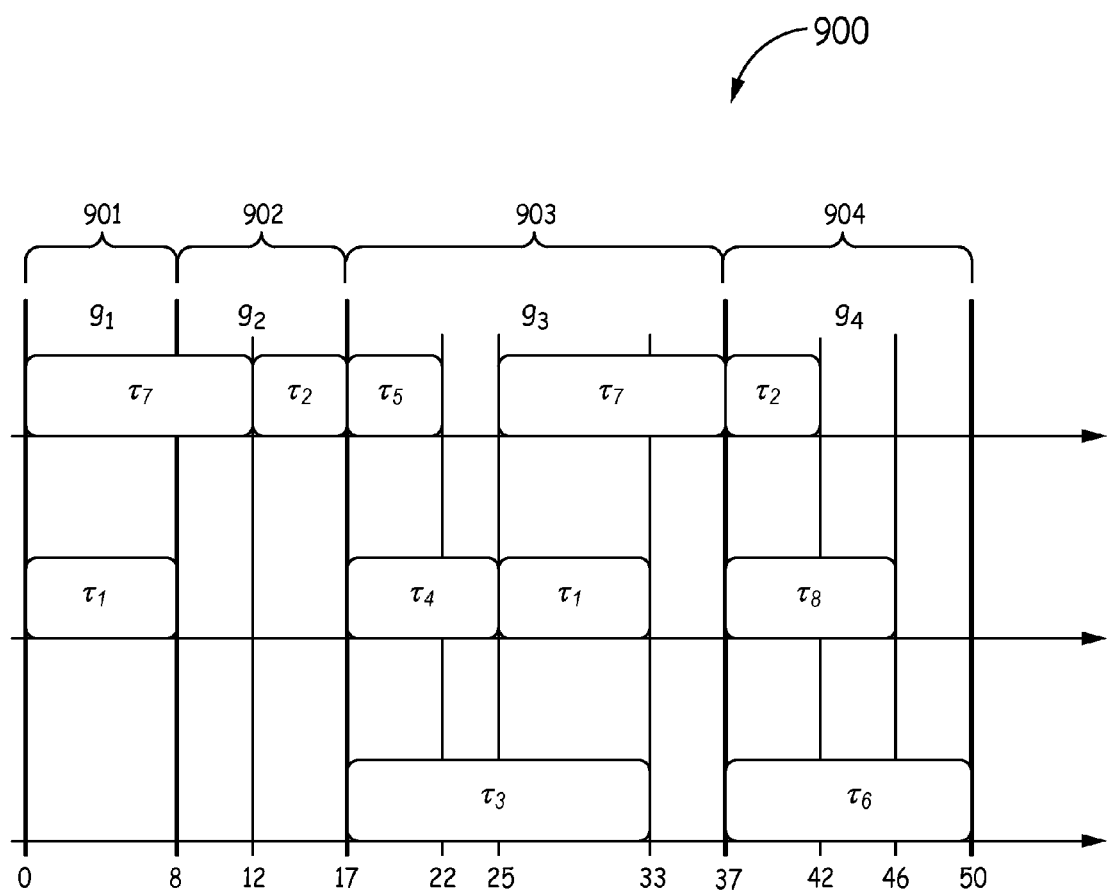
FIG. 9 is a schedule with combined execution groups in one embodiment described in the present disclosure.

FIG. 9 is an exemplary timing diagram illustrating the combining of the different execution groups illustrated in FIG. 7. As described above in relation to the execution group combining algorithm 802 in FIG. 8, the execution group combining algorithm 802 eliminates redundant execution groups identified by the execution group allocation algorithm 602 described in FIG. 6. For example, the execution group combining algorithm 802 determines that the purpose of group $g_2$ is to separate the first instance of instruction entity $\tau_7$ from $\tau_6$, and this is already achieved by other groups (namely group $g_3$ 703 thru $g_7$ 707). Therefore, the execution group combining algorithm 802 safely removes group $g_2$ 702 without violating any constraints.

Also, the execution group combining algorithm 802 determines that the start time of group $g_4$ 704 cannot be modified because it is necessary to satisfy the parallel constraints for instruction entities $\tau_3$, $\tau_4$ and $\tau_5$. However, the execution group combining algorithm 802 determines that groups $g_4$ and $g_5$ can be safely eliminated while still satisfying the parallel constraints. The only new instruction entity instances added to the group containing instruction entities $\tau_3$, $\tau_4$ and $\tau_5$, are the second instances of instruction entities $\tau_7$ and $\tau_1$. Because these instances of instruction entities $\tau_7$ and $\tau_1$ are not released until time instant 25 due to the execution periods of instruction entities $\tau_7$ and $\tau_1$, these instances do not impact the schedule of instruction entities $\tau_3$, $\tau_4$ and $\tau_5$, and hence instruction entities $\tau_3$, $\tau_4$ and $\tau_5$ would be scheduled in parallel, satisfying the constraint. Finally, the execution group combining algorithm 802 can also safely eliminate group $g_8$ because no new instruction entity instance is added to the group containing instruction entities $\tau_6$ and $\tau_8$. The resulting grouping from the execution group combining algorithm is reflected in FIG. 9. Essentially, the execution group combining algorithm 802 maintains the original $g_1$ 701 as $g_1$ 901. However, the execution group combining algorithm 802 combines groups $g_2$ 702 and $g_3$ 703 into a single group $g_2$ 902. Also, the execution group combining algorithm 802 combines groups $g_4$ 704, $g_5$ 705, $g_6$ 706, and $g_7$ 707 into a single group $g_3$ 903. Further, the execution group combining algorithm 802 combines groups $g_8$ 708 and $g_9$ 709 into a single group $g_4$ 904. Reducing the amount of execution groups increases concurrency on a multi-processing unit platform. Since only instruction entities within an execution group can potentially run in parallel, as the number of groups increases, the potential for concurrency decreases given a fixed number of instruction entities.

In certain embodiments, once the execution groups are determined according to the execution group allocation algorithm 602 and the execution group combining algorithm 802 as described above, the instruction entity scheduling algorithm 302 in FIG. 3 may certify that a scheduler can feasibly schedule the required budgets for each instruction entity instance within the execution groups using rate monotonic as the intra-group scheduler. In certain embodiments, there are two strategies for ensuring that an intra-group rate monotonic schedule is feasible. One strategy ensures that each instance will have the needed budget when the execution schedule 306 in FIG. 3 is different from a rate monotonic scheduling strategy. The other strategy ensures that each instance will have the needed budget when the execution schedule 306 in FIG. 3 is consistent with rate monotonic scheduling.

When the execution schedule 306 is different from rate monotonic scheduling of the instruction entity instances, the instruction entity scheduling algorithm 302 ensures that each instruction entity instance gets a sufficient budget in the intra-group schedule by allocating a group-specific budget to each instruction entity instance. The budget of an instruction entity instance in an execution group must be the same as the allocated time window for that instance within that execution group in the original execution schedule. For example, an execution group has a first instance and a second instance on a single processing unit, and the second instance, as scheduled in the original execution schedule, extends into the subsequent execution group. Further, the second instance has a higher priority than the first instance. Under rate monotonic scheduling, the entire second instance can execute before the first instance. Because the entire second instance executed, the first instance will not receive enough execution budget to complete execution. Because the ordering of instruction entity instances under rate monotonic scheduling is different from the execution schedule, only the execution budget within the execution group is allocated to instances of instruction entities during the execution of instruction entities within an execution group.

Alternatively, the order of instruction entity instances under rate monotonic scheduling is the same as that under the execution schedule 306. Therefore, each instruction entity instance is guaranteed to receive at least as many allocations under the intra-group rate monotonic scheduling as in the execution schedule 306. When the execution schedule 606 in FIG. 6 was generated using time allocation algorithm 402, then the following simple update to the execution groups ensures that the intra-group schedule is consistent with rate monotonic scheduling. If T denotes the fastest instruction entity period, then a new execution group must begin at every multiple of T, that is, at instances 0, T, 2T, and so on. Once execution groups are created using the execution group allocation algorithm 602 and the execution group combining algorithm 802, the instruction entity scheduling algorithm 302 checks whether a new execution group begins at every multiple of T. In certain embodiments, where a new group does not begin at time kT and g denotes a group that contains this time instant, the group g is split into 2 groups, $g_1$ and $g_2$. The start time of $g_1$ is the same start time of g, and end time of $g_2$ is the same end time of g, while the end time of $g_1$ and the start time of $g_2$ are set to kT.

Figure 10:
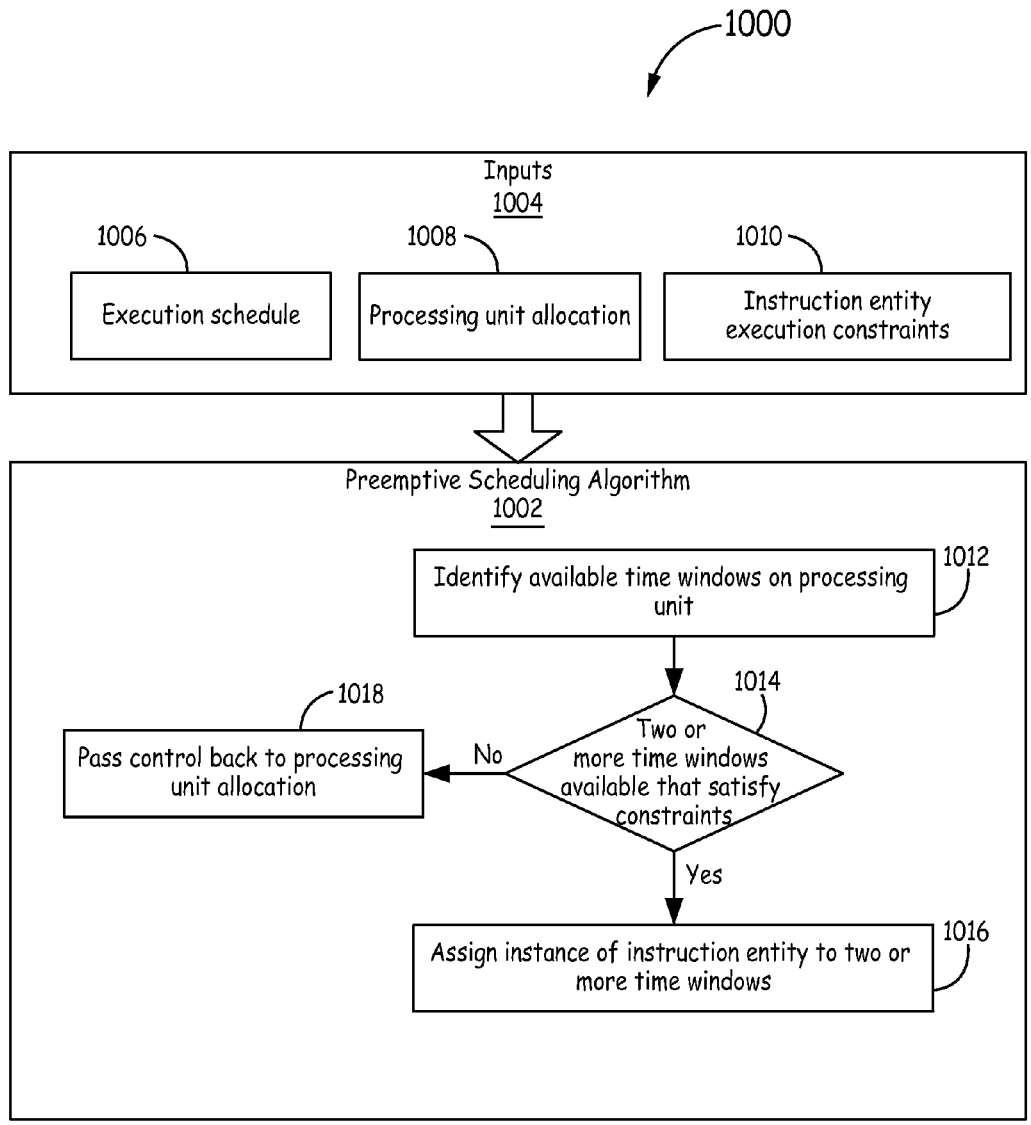
FIG. 10 is a flow diagram of a preemptive scheduling algorithm in one embodiment described in the present disclosure.

FIG. 10 is a flow diagram 1000 illustrating an exemplary preemptive scheduling algorithm for instruction entities. In certain embodiments, the execution of instruction entity scheduling algorithm 302 in FIG. 3 may be unable to find a feasible schedule. However, by allowing preemptions when instruction entity scheduling algorithm 302 fails to find a feasible schedule, one could successfully schedule instances of instruction entities.

In certain embodiments, the preemptive scheduling algorithm 1002 receives inputs 1004 that include an execution schedule 1006, a processing unit allocation 1008, and instruction entity execution constraints 1010. If instruction entity scheduling algorithm 302 finds that an execution schedule with the current instruction entity allotted to a processing unit based on the processing unit allocation 1008 is infeasible, the preemptive scheduling algorithm 1002 executes. For example, the preemptive scheduling algorithm proceeds to 1012 where available time windows on a processing unit are identified. For example, the preemptive scheduling algorithm 1002 identifies non-allocated time windows in the execution schedule 1006 associated with the processing unit designated by the processing unit allocation 1008. When the non-allocated time windows are identified, the preemptive scheduling algorithm 1002 proceeds to 1014, where the preemptive scheduling algorithm 1002 determines if two or more time windows are available that satisfy constraints. For example, the preemptive scheduling algorithm 1002 determines which of the non-allocated time windows in the execution timeline satisfy the constraints for the instruction entity instance that are specified in instruction entity execution constraints 1010. When time windows that satisfy the constraints are identified, the preemptive scheduling algorithm 1002 proceeds to 1016 where instances of instruction entities are assigned to the two or more time windows. For example, preemptive scheduling algorithm 1002 divides the budget of an instruction entity instance into two or more segments depending on the size of the non-allocated time windows. Then, the preemptive scheduling algorithm 1002 assigns the segments to the non-allocated time windows, where the number of segments and assigned time windows are the same. If sufficient budget is not available in the time windows that satisfy all the instruction entity constraints to schedule the instruction entity instance, then the preemptive scheduling algorithm 1002 proceeds to 1018 and passes control back to the processing unit allocation algorithm to select another processing unit. When a new processing unit is allocated, the preemptive scheduling algorithm 1002 attempts to assign instances of the instruction entity in two or more time windows on the newly allotted processing unit.

Figure 11:
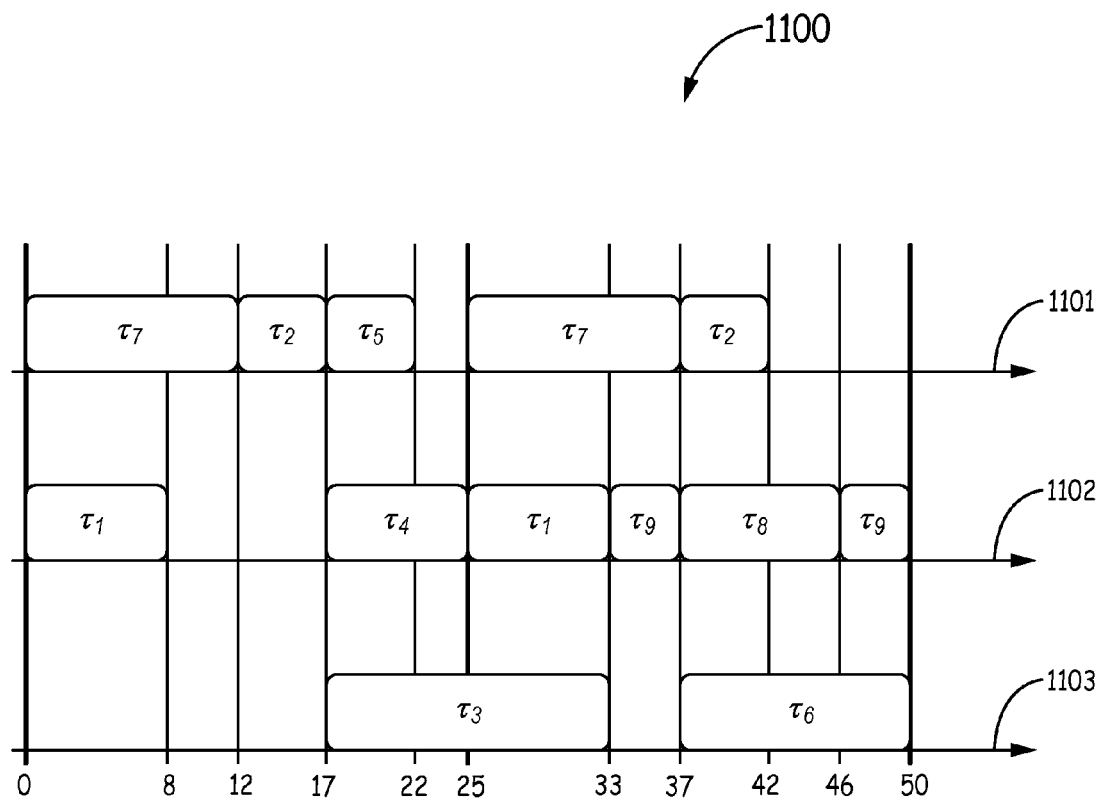
FIG. 11 is an execution schedule with preemptively scheduled instruction entities in one embodiment described in the present disclosure.

FIG. 11 is a diagram illustrating an exemplary schedule produced using the preemptive scheduling algorithm 1002 of FIG. 10 based on the execution schedule 500 illustrated in FIG. 5. For example, the instruction entity scheduling algorithm attempts to schedule new instruction entity $\tau_9$= (50, 8) that is subject to a schedule-before constraint $(\tau_5, \tau_9)$ to the second processing unit having execution timeline 1102. When only non-preemptive scheduling is permitted, the instruction entity scheduling algorithm will find the allocation to the second processing unit to be infeasible because the only time window, T(8):T(17), having sufficient duration for the budget of instruction entity $\tau_9$ does not satisfy the schedule-before constraint. Due to the infeasibility of the non-preemptive schedule, the preemptive scheduling algorithm identifies the time windows that satisfy the schedule before constraint, which include T(33):T(37) and T(46):T(50). Because these time windows satisfy the constraints, the preemptive scheduling algorithm 1002 divides the execution budget of instruction entity $\tau_9$ into two separate segments and allocates one segment to execute within the time window T(33):T(37) and the second segment to execute within the time window T(46):T(50).

In certain embodiments, the instruction entities 118 in FIG. 1 can include interrupt routines that are executed in response to interrupts raised by underlying hardware or system software. In at least one implementation, these routines execute with zero or minimal (in microseconds as opposed to milliseconds) latency. In systems, there are typically two types of interrupts that are handled. These two types of interrupts include time-driven, in which interrupts are raised periodically, and event-driven, in which interrupts can be raised at arbitrary time instants with some bounded maximum number of events in a given time interval. Further, on account of their high criticality, it is generally desirable that these routines should not execute in parallel with other instruction entities that are not interrupt routines.

To handle interrupts, particularly event-driven interrupts that can arrive in an unpredictable manner, the inter-group scheduling strategy can be relaxed. To relax the inter-group schedule, execution time can be reserved for all the interrupt routines at the desired frequencies of execution before other instruction entities are scheduled by instruction entity scheduling algorithm 302 in FIG. 3. In a typical example, a desired frequency would be the fastest instruction entity period among all instruction entities in the list of instruction entities 118. However, the desired frequencies can be larger than this fastest period and can also be different for each interrupt routine. In at least one exemplary implementation, the instruction entity scheduling algorithm 302 first considers the interrupt routines for allocation and scheduling before other instruction entities in instruction entities 118 are considered for allocation and scheduling. Therefore, an interrupt routine with a budget x and period T would be allocated to execution groups that start at time instants 0, T, 2T, and so on. Further, in each execution group, the routine would be allocated x execution units on the processing unit to which it is assigned by the processing unit allocation 314. When allocating these execution units, the instruction entity scheduling algorithm ensures that no other interrupt routine is scheduled to run in parallel on the other processing units. That is, all interrupt routines are scheduled to run sequentially even if they are allocated on different processing units. Thus, the scheduled time duration of any such execution group is equal to the summation of the execution budgets of all the interrupt routines assigned to that group, irrespective of how the routines are distributed between the processing units. These execution groups are specific to interrupt routines, and no other instruction entity will be allocated to them.

Figure 12:
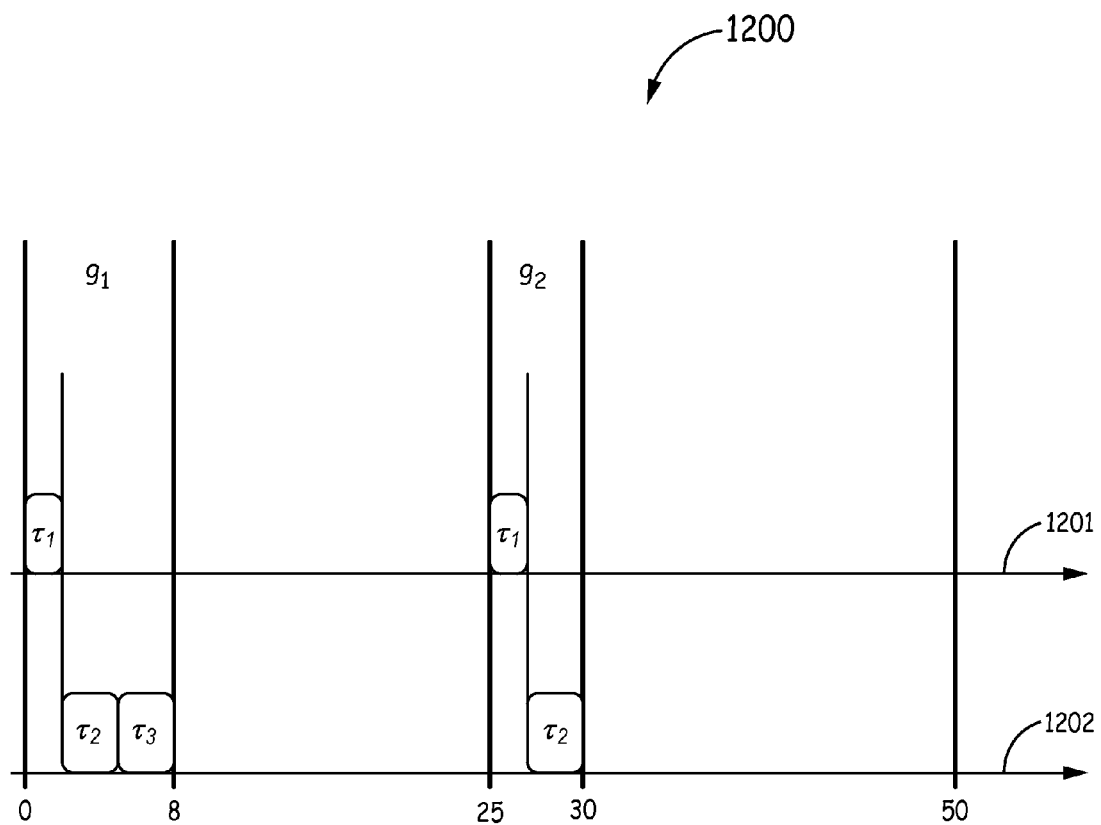
FIG. 12 is an execution schedule with execution groups dedicated for the execution of interrupt routines in one embodiment described in the present disclosure.

FIG. 12 is a diagram of an exemplary schedule 1200 illustrating the scheduling of interrupt routines on execution timelines 1201 and 1202. As shown in this example, three interrupt routines are scheduled on execution timelines 1201 and 1202. The three interrupt routines are defined by, $\tau_1=(25; 2)$, $\tau_2=(25; 3)$ and $\tau_3=(50; 3)$. Routine $\tau_1$ is allocated to the processing unit 108 associated with execution timeline 1201 and the remaining routines $\tau_2$ and $\tau_3$ are allocated to the processing unit 108 associated with execution timeline 1202. Further, the interrupt routines are allocated to groups $g_1$ and $g_2$. In group $g_1$, whose time duration is 8 units, routine $\tau_1$ is scheduled on execution timeline 1201 at T(0):T(2), routine $\tau_2$ is scheduled on execution timeline 1202 at T(2):T(5), and routine $\tau_3$ is scheduled on execution timeline 1202 at T(5):T(8). Similarly, in group g2, routine $\tau_1$ is scheduled on execution timeline 1201 at T(25):T(27) and routine $\tau_2$ is scheduled on execution timeline 1202 at T(27):T(30). Although routine $\tau_2$ could have been scheduled on execution timeline 1202 at T(0):T(3) and T(25):T(28), the interrupts are scheduled sequentially to ensure that sufficient budget is available to service all the interrupts when they arrive sequentially in the worst-case. In certain implementations, the scheduling of groups $g_1$ and $g_2$ is cyclic and repeats every 50 time units. Once all the interrupt routines are scheduled, the instruction entity scheduling algorithm 302 in FIG. 3 schedules the remaining instruction entities in the remaining time-line. For example, the instruction entity scheduling algorithm 302 schedules the remaining instruction entities in instruction entities 118 in FIG. 1 in the remaining time windows T(8):T(25) and T(30):T(50).

If we use the resulting execution schedule as described above in FIG. 12, then the interrupt routines are not guaranteed low latency, because an interrupt could arrive after the allocation for an interrupt routine has expired. Therefore, the interrupt servicing execution groups need to be dynamically scheduled whenever an interrupt arrives, and the remaining groups can be scheduled whenever interrupt routines are not active. Thus, the inter-group schedule is prioritized, such that the execution groups servicing interrupts have higher priority than execution groups that are not servicing interrupts. Among groups that are not servicing interrupts, the schedule is dictated by the original execution schedule; each group will execute for a total duration equal to its duration in the execution schedule, and the temporal order of groups will be the same as in the execution schedule. An execution group servicing interrupts will be scheduled only when an interrupt arrives whose routine is in that group. If an interrupt arrives when another interrupt servicing execution group is active or if multiple interrupts arrive simultaneously, the priority between the groups will depend on the priority between the interrupts. The group that contains the routine for the higher priority interrupt will have higher priority than the group that contains the routine for the lower priority interrupt.

In certain applications, instruction entities may be created and deleted dynamically at runtime via runtime updates, leading to on-line changes in the instruction entity system. Additionally, these instruction entities can also be created and deleted in clusters, so that either the entire cluster of instruction entities is active at some time instant or the entire cluster is inactive. Although the set of active instruction entities and instruction entity clusters can change dynamically, all of the instruction entities and instruction entity clusters that can become active at runtime are fully specified in the configuration of the system, such that the budgets and constraints of these instruction entities are known before the instruction entities 118 are scheduled. Also, in certain implementations, the set of instruction entity clusters that participate in these runtime updates and how many of those instruction entity clusters can be simultaneously active at runtime are also known before the instruction entities 118 are scheduled. Finally, the instruction entity clusters are independent from each other, such that execution constraints cannot be specified between instruction entities in different clusters.

Suppose C denotes the set of instruction entity clusters that are eligible for dynamic creation and deletion, and x denotes the maximum number of such instruction entity clusters that can be active simultaneously. The dynamic behavior in the higher level inter-group schedule is handled by pre-allocating sufficient execution time for the x most expensive (in terms of processor utilization) instruction entity clusters (called reserved utilization). Then, at runtime, this reserved utilization can be used by any of the instruction entity clusters in C, at most x of them simultaneously. Whenever an update occurs to the set of active instruction entity clusters, the newly activated clusters are allocated processor utilization from the reserved utilization. Since at most x clusters can be simultaneously active and we have reserved enough utilization to service the x largest utilization clusters simultaneously, there will be guaranteed budget for any active cluster at runtime.

We now discuss an exemplary technique for how to determine the utilization of an instruction entity cluster, and how to reserve utilization for these clusters in the higher level inter-group schedule. Each instruction entity cluster in C is scheduled in isolation using the instruction entity scheduling algorithm 302 from FIG. 3. Using this schedule the utilization of each cluster can be determined as the ratio of total scheduled duration for the cluster to the largest period among all the instruction entities in the cluster. The scheduled duration includes all time intervals in which at least one of the processing units 108 is being used by the instruction entity cluster. Note that the schedule for a single instruction entity cluster may comprise one or more execution groups; there is no correlation between instruction entity clusters and execution groups. Now the x highest cluster utilizations can be determined, which then gives us the total utilization that must be reserved on all the processing units 108 in the higher level inter-group schedule. Suppose T denotes the fastest period among all the instruction entities in all the clusters in C and R denotes the utilization to be reserved. Then, we create a representative instruction entity $I_R$ with period T and budget equal to R*T, and include it in the list of instruction entities 118. $I_R$ represents the reserved utilization for the entire set of instruction entity clusters in C, and all instruction entity execution constraints involving instruction entities in C would be enforced through $I_R$. As stated earlier we do not allow execution constraints between instruction entities in different clusters in C. Hence any constraint involving an instruction entity in C, would also involve either another instruction entity in the same cluster in C or an instruction entity not in any of the clusters in C. If the constraint is between instruction entities that are in the same cluster in C, then the schedule generated above in isolation for the cluster will enforce the constraint. If the constraint is between an instruction entity in a cluster in C and an instruction entity not in any of the clusters in C, then the constraint must be re-specified between $I_R$ and the instruction entity not in any of the clusters in C. Note that we do not allow a parallel constraint to be specified between an instruction entity in a cluster in C and an instruction entity not in any of the clusters in C, because those two instruction entities cannot be scheduled to run in parallel using our strategy. Once all the execution constraints involving instruction entity $I_R$ are specified and the interrupt routines have been scheduled as described above in relation to FIG. 12, the rest of the instruction entities including $I_R$ are scheduled using the instruction entity scheduling algorithm 302. When scheduling $I_R$ care must be taken to ensure that the same time windows are reserved on all the processing units 108 in parallel for $I_R$, because the budget of $I_R$ indeed represents an identical reservation on all the processing units 108 for the instruction entities in C. To simplify scheduling of instruction entity $I_R$, we update our sorting strategy 310 so that $I_R$ is the first instruction entity to be considered for scheduling by scheduling algorithm 302.

At runtime, when a new set of instruction entity clusters from C become active, the instruction entity clusters are assigned to the scheduled time windows of instruction entity $I_R$. In each period T of instruction entity $I_R$, each active cluster is assigned budget proportional to the cluster's utilization. If the utilization of an active cluster is U, then it is assigned budget equal to U*T on each processing unit 108 in parallel from the budget reserved by $I_R$. Within the assigned budget, the instruction entities of the cluster are scheduled using the schedule generated for the cluster in isolation as described above. The temporal order between the execution groups and the maximum duration for each execution group should be the same as in the schedule.

Figure 13:
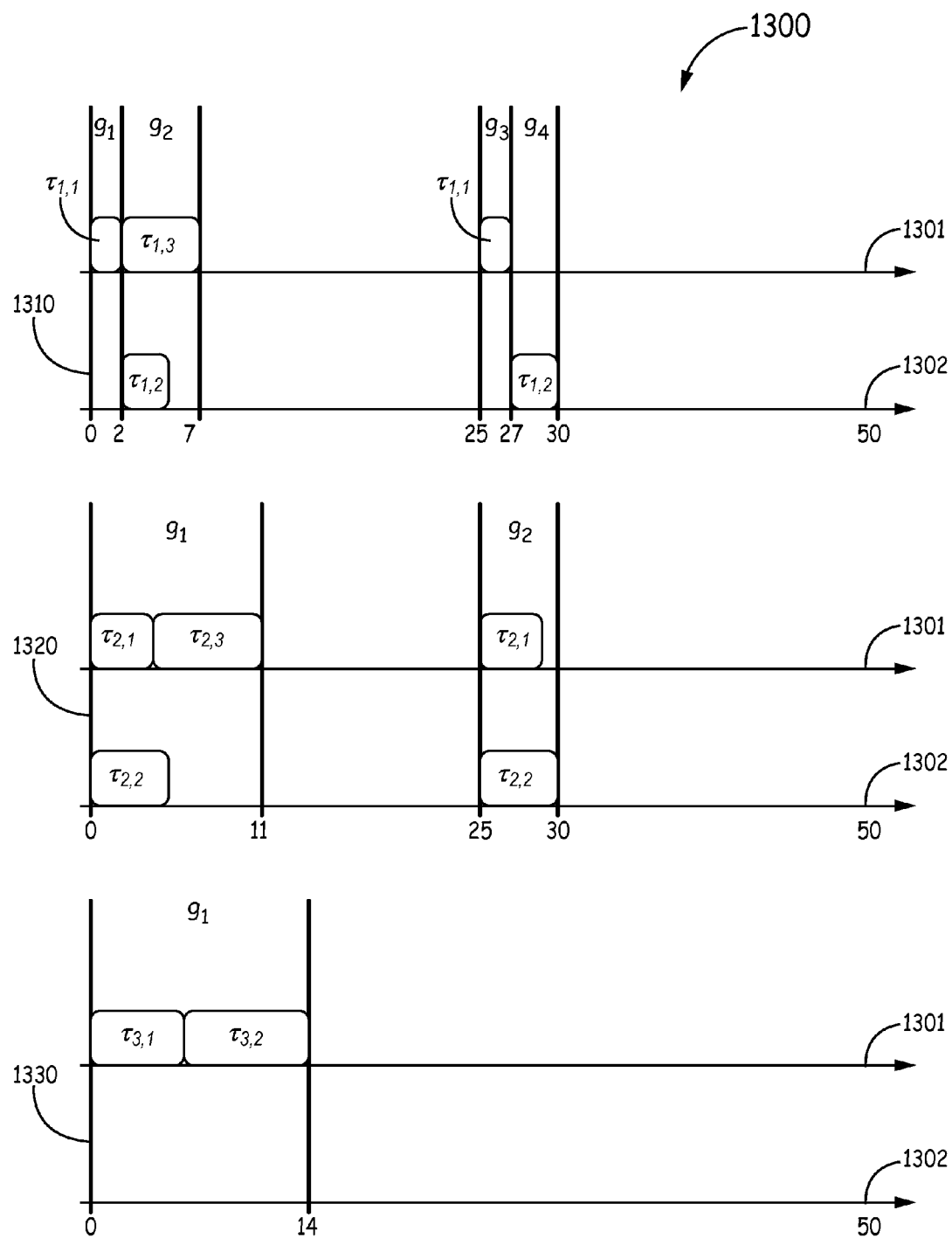
FIG. 13 illustrates isolated execution schedules for multiple instruction entity clusters in one embodiment described in the present disclosure.
Figure 14:
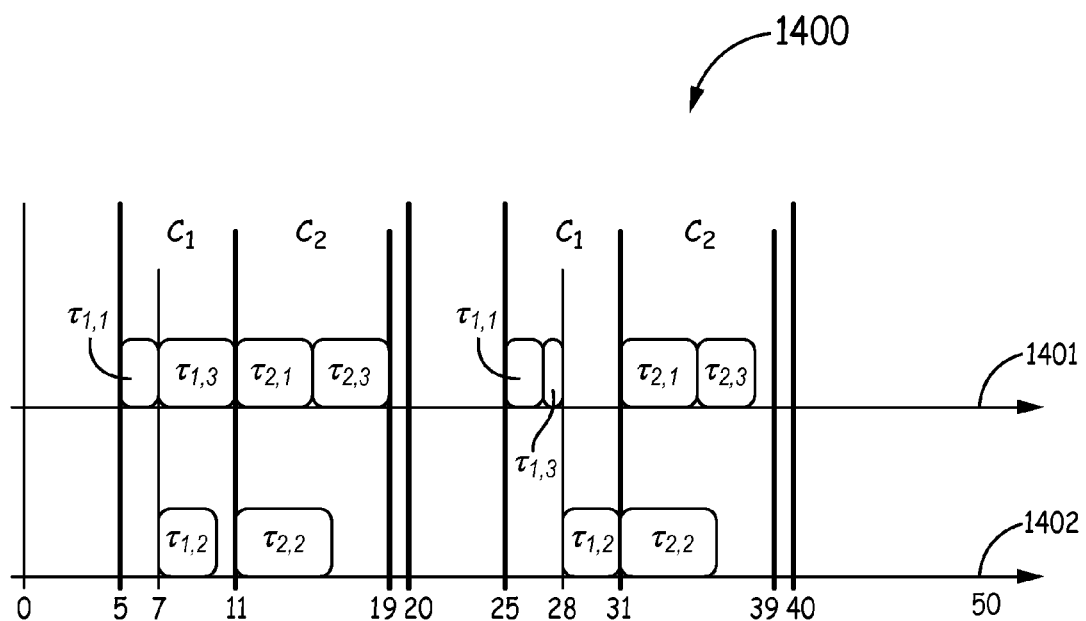
FIG. 14 is an execution schedule that includes reservations for dynamically created instruction entity clusters in one embodiment described in the present disclosure.

FIGS. 13 and 14 are diagrams illustrating the scheduling of instruction entity clusters. Consider the set of instruction entity clusters C={$C_1,C_2,C_3$}, where $C_1$={$\tau_{1,1}$=(25; 2); $\tau_{1,2}$=(25; 3); $\tau_{1,3}$=(50; 5)}, $C_2$={$\tau_{2,1}$=(25; 4); $\tau_{2,2}$=(25; 5); $\tau_{2,3}$=(50; 7)}, and $C_3$={$\tau_{3,1}$=(50; 6); $\tau_{3,2}$=(50; 8)}. Suppose the instruction entity constraints are B={($\tau_{1,1}$; $\tau_{1,2}$); ($\tau_{3,1}$; $\tau_{3,2}$)} and suppose at most any two of these three instruction entity clusters can be simultaneously active at runtime. FIG. 13 illustrates the utilization of these clusters in isolated schedules 1310, 1320, and 1330 on execution timelines 1301 and 1302. As can be seen in FIG. 13, the utilization of clusters $C_1$ in schedule 1310; $C_2$ in schedule 1320, and $C_3$ in schedule 1330 is 12/50 (or 6/25); 16/50 (or 8/25) and 14/50 (or 7/25), respectively. Since the two largest utilization values are 8/25 and 7/25 and the fastest instruction entity period is 25 time units, a total budget of 15 and period of 25 would be assigned to instruction entity $I_R$. FIG. 14, is a timing diagram 1400 illustrating two of the three instruction entity clusters from FIG. 13, namely $C_1$ and $C_2$, being simultaneously active and scheduled for execution on execution timelines 1401 and 1402. The scheduled time windows for instruction entity $I_R$ occur between time instants T(5):T(20) and T(25):T(40). Since the utilization of cluster $C_1$ is 6/25, it is assigned a budget of 6 in every 25 time units from the budget of instruction entity $I_R$ (time windows T(5):T(11) and T(25):T(31) in FIG. 14). Since the utilization of cluster $C_2$ is 8/25, it is assigned a budget of 8 in every 25 time units from the budget of instruction entity $I_R$ (time windows T(11):T(19) and T(31):T(39) in FIG. 14). Within the assigned budget of each cluster, the execution group durations and scheduling order are consistent with the instruction entity clusters' isolated schedule shown in FIG. 13.

The scheduling of instruction entity executions on multiple processing units and allocation of instances of instruction entity execution to execution groups as explained above ensures that all constraints on instruction entity execution are satisfied while measuring and bounding the effects of executing the instruction entities on multiple processing units.

Figure 15:
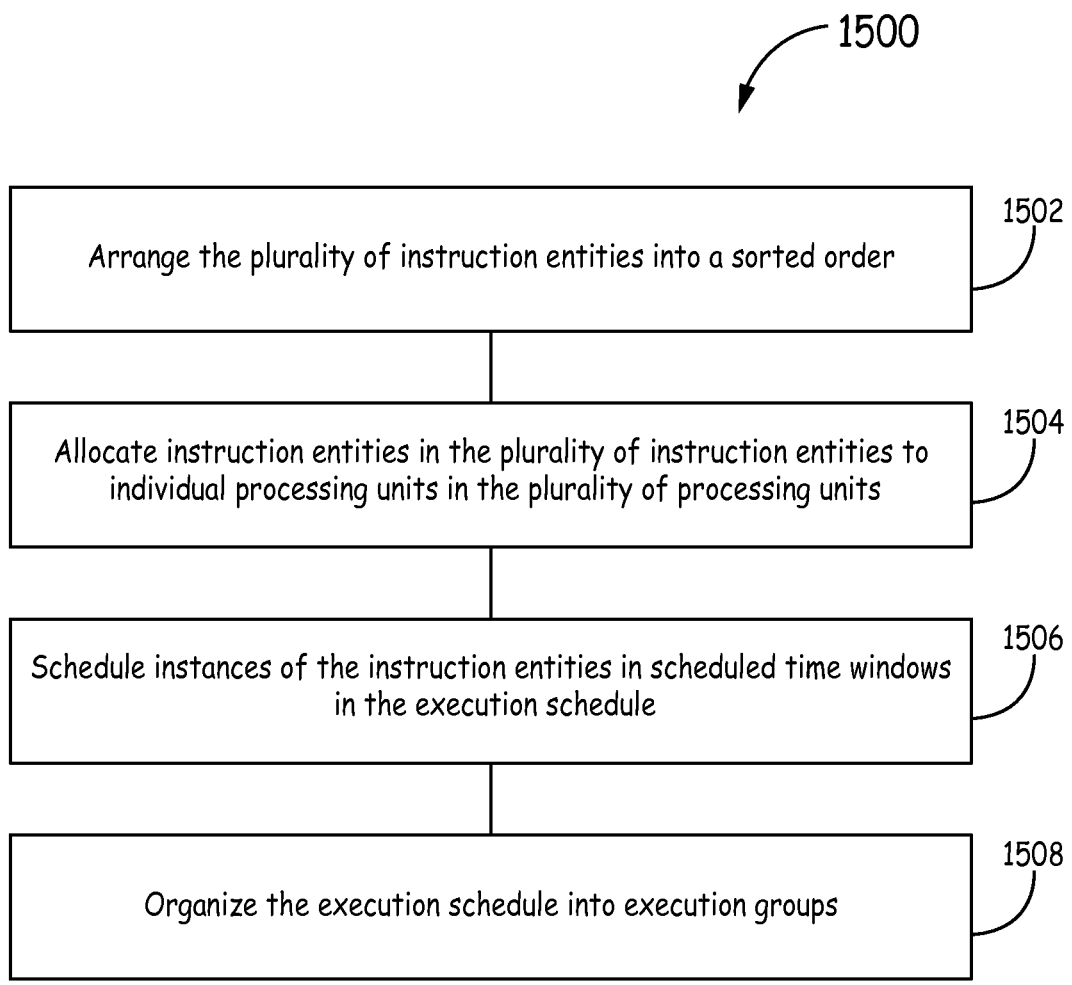
FIG. 15 is a flow diagram of a method for scheduling instruction entities in one embodiment described in the present disclosure.

FIG. 15 is a flow diagram of an exemplary method 1500 for scheduling a plurality of instruction entities on multiple processing units. Method 1500 proceeds at 1502 where the plurality of instruction entities are arranged into a sorted order. As described above in relation to FIG. 3, the instruction entities are arranged into an order that will improve the likelihood that a feasible schedule is found. When the plurality of instruction entities are sorted, method 1500 proceeds at 1504 where the instruction entities in the plurality of instruction entities are allocated to individual processing units in the plurality of processing units. For example, a processing unit allocation algorithm allocates the different instruction entities to the different processing units according to the sorted order of the instruction entities.

In certain implementations, method 1500 proceeds at 1506, where instances of the instruction entities are scheduled in scheduled time windows in the execution schedule. For instance, a time allocation algorithm steps through the instruction entities according to the sorted order and finds scheduled time windows for execution on the allocated processing units. When the instances of the instruction entities in the plurality of instruction entities have been allocated to an associated scheduled time window, method 1500 proceeds at 1508, where the execution schedule is organized into execution groups. For example, the instances of the instruction entities are divided into execution groups based on the constraints of the instruction entities. When the instances are divided into execution groups, the execution groups can be combined to eliminate redundant execution groups. The scheduling of the execution groups for execution on multiple processing units will ensure that the constraints and requirements of the scheduled instruction entities in the execution group are satisfied.

EXAMPLE EMBODIMENTS

Example 1 includes a system for scheduling a plurality of instruction entities on a plurality of processing units, the system comprising: a memory unit configured to store schedule generation instructions and an execution schedule, wherein the execution schedule defines an execution schedule for the plurality of instruction entities on the plurality of processing units; and a generation processing unit coupled to the memory unit and configured to execute the schedule generation instructions, wherein the schedule generation instructions cause the generation processing unit to: generate an inter-group schedule, the inter-group schedule defining a temporal order for scheduling a plurality of execution groups, wherein an execution group comprises a set of instruction entities that can execute on the plurality of processing units during a defined period of time; and generate an intra-group schedule, the intra-group schedule defining an execution priority for the instruction entities within execution groups.

Example 2 includes the system of Example 1, wherein the plurality of processing units execute instruction entities based on the inter-group schedule.

Example 3 includes the system of any of Examples 1-2, wherein the plurality of processing units uses the intra-group schedule to schedule the instruction entities according to a rate monotonic scheduling algorithm.

Example 4 includes the system of any of Examples 1-3, wherein the generation processing unit generates the inter-group schedule and the intra-group schedule by: arranging the plurality of instruction entities into a sorted order; according to the sorted order of the plurality of instruction entities, allocate an instruction entity in the plurality of instruction entities to a processing unit in the plurality of processing units and define an execution time window for each instance of instruction entity execution in the execution schedule; and organize the execution schedule into execution groups.

Example 5 includes the system of Example 4, wherein the generation processing unit arranges the plurality of instruction entities into the sorted order based on at least one of: an execution period for individual instruction entities in the plurality of instruction entities; schedule-before and parallel constraints of the individual instruction entities; and an execution budget for the individual instruction entities.

Example 6 includes the system of any of Examples 1-5, wherein the generation processing unit generates the inter-group schedule and the intra-group schedule based on instruction entity constraints.

Example 7 includes the system of Example 6, wherein the instruction entity constraints comprise at least one of: an execution budget; an execution period; a parallel relationship; a non-parallel relationship; and a schedule-before relationship.

Example 8 includes the system of any of Examples 1-7, wherein the generation processing unit allocates at least one time window on the plurality of processing units for executing dynamically created instruction entities.

Example 9 includes the system of Example 8, wherein the dynamically created instruction entities are arranged in instruction entity clusters.

Example 10 includes the system of any of Examples 1-9, wherein the generation processing unit is in the plurality of processing units.

Example 11 includes the system of any of Examples 1-10, wherein an instruction entity is a set of at least one computer readable instruction that is to be executed by the plurality of processing units and comprises at least one of: a task; a thread; an application; and a computer program.

Example 12 includes a method for generating an execution schedule for a plurality of instruction entities for execution on a plurality of processing units: arranging the plurality of instruction entities into a sorted order; allocating instruction entities in the plurality of instruction entities to individual processing units in the plurality of processing units; scheduling instances of the instruction entities in scheduled time windows in the execution schedule, wherein the instances of the instruction entities are scheduled in scheduled time windows according to the sorted order of the plurality of instruction entities; and organizing the execution schedule into execution groups.

Example 13 includes the method of Example 12, wherein arranging the plurality of instruction entities into the sorted order comprises: arranging the plurality of instruction entities according to an execution period; where the instruction entities in the plurality of instruction entities have the same execution period, arranging the instruction entities according to a topological sort based on schedule-before and parallel relationships; and where the instruction entities are indistinguishable in the topological sort, arranging the instruction entities according to an execution budget.

Example 14 includes the method of any of Examples 12-13, wherein scheduling the instances of the instruction entities in the scheduled time windows comprises: searching for an available time window for execution of an instruction entity on an execution timeline of an allocated processing unit in the plurality of processing units; if the available time window is found, determining whether the available time window satisfies constraints and requirements for the instruction entity; and scheduling an instance of the instruction entity in the available time window.

Example 15 includes the method of Example 14, further comprising at least one of, when the available time window is not found that satisfies the constraints and the requirements: re-allocating the instruction entity to a different processing unit in the plurality of processing units; and declaring the execution schedule to be infeasible.

Example 16 includes the method of Example 15, wherein declaring the execution schedule to be infeasible comprises preemptively scheduling the instance of the instruction entity in at least two execution time windows.

Example 17 includes the method of any of Examples 12-16, wherein organizing the execution schedule into the execution groups comprises: identifying the constraints associated with the plurality of instruction entities; when the constraint is a parallel constraint, arranging the execution groups such that the execution of instances of instruction entities associated with the constraint and the start time of an execution group are scheduled to begin simultaneously; when the constraint is not a parallel constraint, arranging the execution groups such that the execution of the instances of instruction entities associated with the constraint does not overlap in time; and eliminating redundant execution groups by combining at least two execution groups together.

Example 18 includes the method of any of Examples 12-17, further comprising: allocating an interrupt time window on the plurality of processing units for the execution of interrupt routines.

Example 19 includes the method of any of Examples 12-18, further comprising: allocating at least one time window on the plurality of processing units for the execution of dynamically created instruction entities.

Example 20 includes a program product for creating an execution schedule for instruction entities that execute on a plurality of processing units in a processing cluster, the program product comprising a plurality of instructions tangibly stored on a non-transitory storage medium, the instructions operable when executed, to cause a generation processing unit to: arrange the plurality of instruction entities into a sorted order; allocate instruction entities in the plurality of instruction entities to individual processing units in the plurality of processing units; schedule instances of the instruction entities in scheduled time windows in the execution schedule, wherein the instances of the instruction entities are scheduled in scheduled time windows according to the sorted order of the plurality of instruction entities; and organize the execution schedule into execution groups.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for scheduling a plurality of instruction entities on a plurality of processing units in a computing system, the system comprising:
    a memory unit configured to store schedule generation instructions and an execution schedule, wherein the execution schedule is a definition of when the plurality of instruction entities are available for execution on particular processing units in the plurality of processing units for the computing system and when the execution of the plurality of instruction entities should complete; and
    a generation processing unit coupled to the memory unit and configured to execute the schedule generation instructions, wherein the schedule generation instructions cause the generation processing unit to:
        generate an inter-group schedule, the inter-group schedule defining a temporal order for execution of a plurality of execution groups and execution duration for each execution group, wherein an execution group comprises a group of instruction entities in the plurality of instruction entities, wherein a first set of instruction entities in the group of instruction entities executes on a first processing unit in the plurality of processing units, wherein the group of instruction entities is constrained to execute within a respective execution duration, wherein the respective execution duration is comprised of a sum of processing budgets allotted to instruction entities in the first set of instruction entities and instruction entities in the plurality of instruction entities that are not part of the group of instruction entities are prevented from executing on processing units in the computing system during the execution of the group of instruction entities, wherein the instruction entities other than the first set of instruction entities in the execution group execute on a processing unit in the plurality of processing units other than the first processing unit; and
        generate an intra-group schedule, the intra-group schedule defining an execution priority for the instruction entities within execution groups, the intra-group schedule specifying an execution order between instruction entities in the group of instruction entities that execute on the same processing unit in the plurality of processing units;
    wherein the plurality of processing units executes instruction entities based on the inter-group schedule.

2. The system of claim 1, wherein the plurality of processing units uses the intra-group schedule to schedule the instruction entities in the group of instruction entities independently on each processing unit in the plurality of processing units.

3. The system of claim 1, wherein the generation processing unit generates the inter-group schedule and the intra-group schedule by:
    arranging the plurality of instruction entities into a sorted order;
    according to the sorted order of the plurality of instruction entities, allocate an instruction entity in the plurality of instruction entities to a processing unit in the plurality of processing units and define an execution time window for each instance of instruction entity execution in the execution schedule; and
    organize instruction entities that execute according to the execution schedule into execution groups.

4. The system of claim 3, wherein the generation processing unit arranges the plurality of instruction entities into the sorted order based on at least one of:
    an execution period for individual instruction entities in the plurality of instruction entities;
    schedule-before and parallel constraints of the individual instruction entities, wherein a parallel constraint dictates that at least a portion of different instruction entities execute concurrently on different processing units in the plurality of processing units; and
    an execution budget for the individual instruction entities.

5. The system of claim 1, wherein the generation processing unit generates the inter-group schedule and the intra-group schedule based on instruction entity constraints, wherein an instruction entity constraint defines a relationship between the execution of different instruction entities.

6. The system of claim 5, wherein the instruction entity constraints comprise at least one of:

an execution budget;
an execution period;
a parallel relationship;
a non-parallel relationship; and\
a schedule-before relationship.

7. The system of claim 1, wherein the generation processing unit allocates at least one time window on the plurality of processing units for at least one of:
    executing dynamically created instruction entities; and
    executing interrupt routines.

8. The system of claim 7, wherein the dynamically created instruction entities are arranged in instruction entity clusters, wherein an instruction entity cluster is a group of instruction entities that can be dynamically executed at runtime within a budget allotted to a run time instruction entity.

9. The system of claim 1, wherein the generation processing unit is in the plurality of processing units.

10. The system of claim 1, wherein an instruction entity is a set of at least one computer readable instruction that is to be executed by the plurality of processing units and comprises at least one of:
    a task;
    a thread;
    an application; and
    a computer program.

11. A method for generating an execution schedule for executing a plurality of instruction entities on a plurality of processing units in a computing system, the method comprising:
    arranging the plurality of instruction entities into a temporal order;
    allocating instruction entities in the plurality of instruction entities to individual processing units in the plurality of processing units;
    scheduling instances of the instruction entities in scheduled time windows in the execution schedule, wherein the instances of the instruction entities are scheduled in scheduled time windows according to the sorted order of the plurality of instruction entities;
    organizing the execution schedule into execution groups, wherein an execution group comprises a group of instruction entities in the plurality of instruction entities, wherein a first set of instruction entities in the group of instruction entities executes on a first processing unit in the plurality of processing units, wherein the group of instruction entities is constrained to execute within a respective execution duration comprised of a sum of processing budgets allotted to instruction entities in the first set of instruction entities and instruction entities in the plurality of instruction entities that are not part of the group of instruction entities are prevented from executing on processing units in the computing system during the execution of the group of instruction entities, wherein the instruction entities other than the first set of instruction entities in the execution group execute on a processing unit in the plurality of processing units other than the first processing unit;
    generating an intra-group schedule, the intra-group schedule defining an execution priority for the instruction entities within execution groups, the intra-group schedule specifying an execution order between instruction entities in the group of instruction entities that execute on the same processing unit in the plurality of processing units; and
    executing the plurality of instruction entities on the plurality of processing units based on the execution schedule.

12. The method of claim 11, wherein arranging the plurality of instruction entities into the sorted order comprises:
    arranging the plurality of instruction entities according to an execution period;
    where the instruction entities in the plurality of instruction entities have the same execution period, arranging the instruction entities according to a topological sort based on schedule-before and parallel relationships; and
    where the instruction entities are indistinguishable in the topological sort, arranging the instruction entities according to an execution budget.

13. The method of claim 11, wherein scheduling the instances of the instruction entities in the scheduled time windows comprises:
    searching for an available time window for execution of an instruction entity on an execution timeline of an allocated processing unit in the plurality of processing units;
    if the available time window is found, determining whether the available time window satisfies constraints and requirements for the instruction entity; and
    scheduling an instance of the instruction entity in the available time window.

14. The method of claim 13, further comprising at least one of, when the available time window is not found that satisfies the constraints and the requirements:
    re-allocating the instruction entity to a different processing unit in the plurality of processing units; and
    declaring the execution schedule to be infeasible by preemptively scheduling the instance of the instruction entity in at least two execution time windows.

15. The method of claim 11, wherein organizing the execution schedule into the execution groups comprises:
    identifying the constraints associated with the plurality of instruction entities;
    when the constraint is a parallel constraint, arranging the execution groups such that the execution of instances of instruction entities associated with the constraint and the start time of an execution group are scheduled to begin simultaneously;
    when the constraint is not a parallel constraint, arranging the execution groups such that the execution of the instances of instruction entities associated with the constraint does not overlap in time; and
    eliminating redundant execution groups by combining at least two execution groups together.

16. The method of claim 11, further comprising:
    allocating at least one interrupt time window on the plurality of processing units for the execution of interrupt routines, wherein the at least one interrupt time window is allocated before the plurality of instruction entities are scheduled.

17. The method of claim 11, further comprising:
    allocating at least one time window on the plurality of processing units for the execution of dynamically created instruction entities, wherein the allocation of the at least one time window comprises:
        allocating execution time for the execution of a dynamic instruction entity cluster that uses more processing resources than other dynamic instruction entity clusters; and scheduling the execution of dynamically created instruction entities as the dynamically created instruction entities are created within the allocated execution time.

18. A program product for creating an execution schedule for instruction entities that execute on a plurality of processing units in a processing cluster in a computing system, the program product comprising a plurality of instructions tangibly stored on a non-transitory storage medium, the instructions operable when executed, to cause a generation processing unit to:
arrange the plurality of instruction entities into a temporal order;
allocate instruction entities in the plurality of instruction entities to individual processing units in the plurality of processing units;
schedule instances of the instruction entities in scheduled time windows in the execution schedule, wherein the instances of the instruction entities are scheduled in scheduled time windows according to the sorted order of the plurality of instruction entities;
organize the execution schedule into execution groups, wherein an execution group comprises a group of instruction entities in the plurality of instruction entities, wherein a first set of instruction entities in the group of instruction entities executes on a first processing unit in the plurality of processing units, wherein the group of instruction entities is constrained to execute within a respective execution duration comprised of a sum of processing budgets allotted to instruction entities in the first set of instruction entities and instruction entities in the plurality of instruction entities that are not part of the group of instruction entities are prevented from executing on processing units in the computing system during the execution of the group of instruction entities, wherein the instruction entities other than the first set of instruction entities in the execution group execute on a processing unit in the plurality of processing units other than the first processing unit;
generate an intra-group schedule, the intra-group schedule defining an execution priority for the instruction entities within execution groups, the intra-group schedule specifying an execution order between instruction entities in the group of instruction entities that execute on the same processing unit in the plurality of processing units; and
wherein the plurality of instruction entities are executed on the plurality of processing units based on the execution schedule.

* * * * *